US006263318B1

(12) United States Patent
Kimura et al.

(10) Patent No.: US 6,263,318 B1
(45) Date of Patent: Jul. 17, 2001

(54) CONTENTS SALES METHOD AND CYBER MALL SYSTEM USING SUCH METHOD AND STORAGE MEDIUM STORING THEREIN ITS CONTENTS SALES PROGRAM

(75) Inventors: Tomoko Kimura, Tokyo; Nobuya Okayama, Kawasaki; Hiroshi Koike, Sagamihara; Miyoko Namioka, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/244,050

(22) Filed: Feb. 4, 1999

(30) Foreign Application Priority Data

Feb. 6, 1998 (JP) .................................. 10-025356

(51) Int. Cl.$^7$ .................................................. G06F 17/60
(52) U.S. Cl. ............................. 705/27; 705/14; 705/20; 705/26; 705/27; 705/44
(58) Field of Search .......................... 705/14, 20, 21, 705/26, 27, 44, 75; 701/209; 345/351, 355; 455/5, 4; 348/12, 6

(56) References Cited

U.S. PATENT DOCUMENTS

| 4,677,552 | * | 6/1987 | Sibley, Jr. ........................... 364/408 |
| 5,809,144 | | 9/1998 | Sirbu et al. . |
| 5,946,665 | * | 8/1999 | Suzuki et al. .......................... 705/26 |

FOREIGN PATENT DOCUMENTS

| 675624 | * | 4/1995 | (EP) . |
| 822535 A2 | | 2/1998 | (EP) . |
| WO97/03410 | | 1/1997 | (WO) . |
| WO98/07085 | | 2/1998 | (WO) . |

OTHER PUBLICATIONS

Varbusiness, E–commerce, pp 1–3, Dec. 1997.*
Computerworld, Electronic commerce, pp 1–4, Dec. 1997.*
Weston Rusty, Web automation, Online service information, pp 1–4, Jul. 1997.*
Glenn Rifkin, Open market Hopes, pp 1, Mar. 1996.*
Multimedia, World travel online, pp 1, Sep. 1993.*

* cited by examiner

Primary Examiner—James P. Trammell
Assistant Examiner—Mussie Tesfamariam
(74) Attorney, Agent, or Firm—Mattingly, Stanger & Malur, P.C.

(57) ABSTRACT

A cyber mall system has a contents sales apparatus for selling digital contents, a contents purchasing apparatus, and a network for connecting those components. When the digital contents are registered into the contents sales apparatus, in the case where the digital contents are sold by the contents sales apparatus for defining digital contents using conditions constructed by a server side access control to the digital contents which is executed on the contents sales apparatus side and a physical act restriction to control an access to the digital contents which is executed on the contents purchasing apparatus side that purchased the digital contents, digital contents personal using conditions are generated on the basis of the digital contents using conditions and are given to a customer. When the digital contents are again purchased if the delivery of the digital contents fails, so long as the digital contents personal using conditions given at the time of purchase are valid, the digital contents are again delivered without again collecting a digital contents value.

10 Claims, 26 Drawing Sheets

FIG. 3
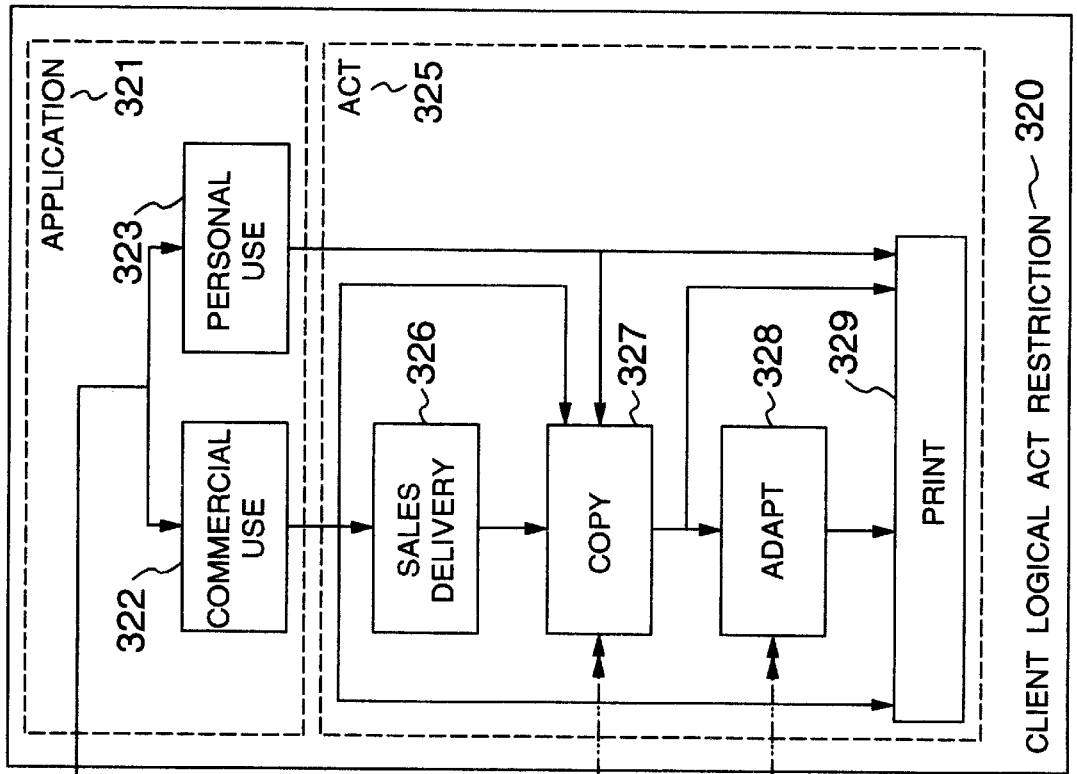
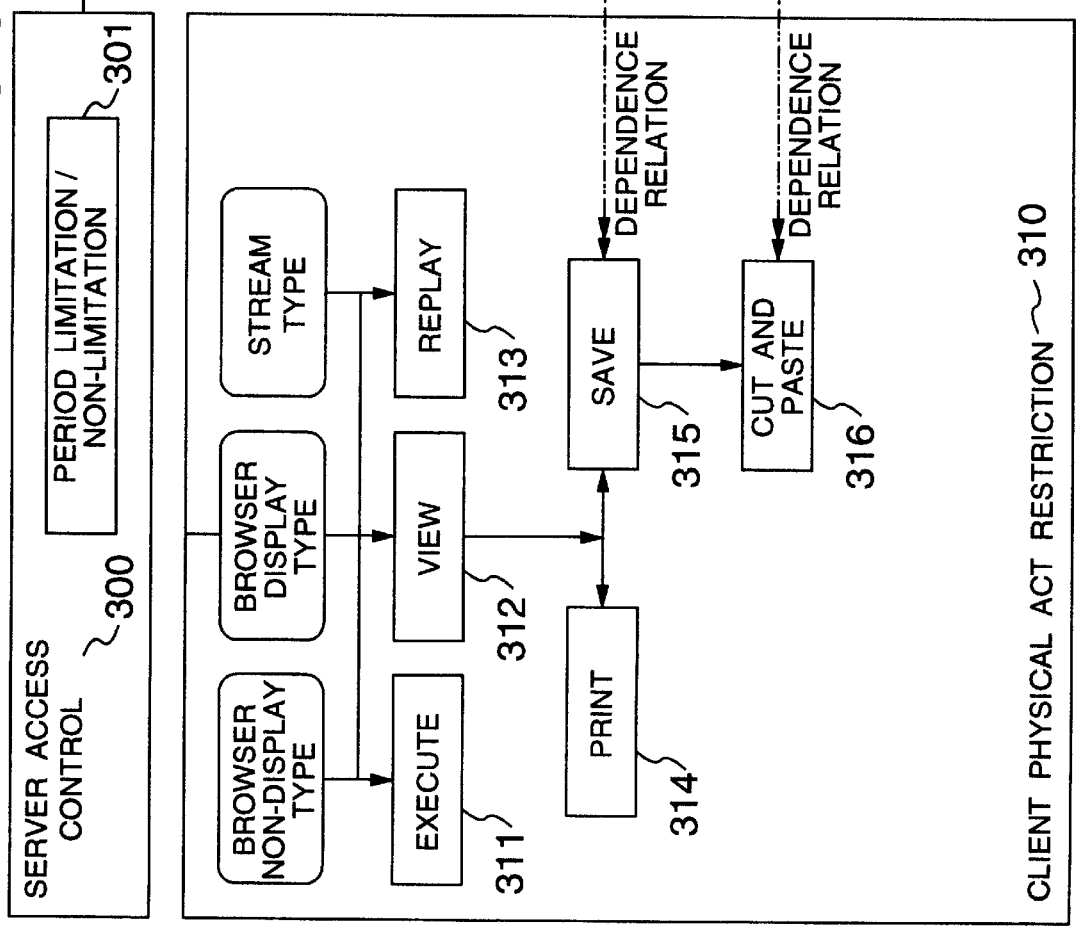

FIG. 6

DIGITAL CONTENTS GOODS DEFINITION

GOODS NAME [ APPLE ]~601

GOODS PRICE
⊙ CHARGE [ ¥100 ]~602   ○ FREE

INPUT OF CUSTOMER INFORMATION
○ NAME ~603
⊙ E-MAIL ADDRESS ~604
○ ADDRESS ~605
○ TEL NO. ~606
○ INPUT IS UNNECESSARY ~607

APPROVAL TO AGREEMENT IS
⊙ NECESSARY   ○ UNNECESSARY
~608           ~609

610~( TRANSMIT )        ( CANCEL )

FIG. 7

DEFINITION OF DIGITAL CONTENTS USING CONDITIONS

SETTING OF ACCESS CONTROL
  SETTING OF PERIOD
    ○ RELATIVE TERM 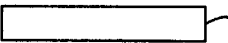 ~701
    ○ ABSOLUTE TERM 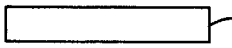 ~702
    ◉ NON-LIMITATION ~703

SETTING OF LEGAL RESTRICTION OF DIGITAL CONTENTS
  EXPRESSING METHOD OF CONTENTS
    ◉ SEE        ○ EXECUTE    ○ REPLAY
      ~704         ~705         ~706

APPLICATION PERMISSION OF CONTENTS
    ◉ PERSONAL USE           ○ COMMERCIAL USE
        ~707                     ~708

USE PERMISSION RANGE OF CONTENTS
    ◉ INHIBIT SALES DELIVERY   ○ PERMIT SALES DELIVERY
      (COMMERCIAL USE) ~709      (COMMERCIAL USE) ~710
    ○ INHIBIT COPY ~711        ◉ PERMIT COPY ~712
                     ~713
    ◉ INHIBIT ADAPTING         ○ PERMIT ADAPTING ~714
    ○ INHIBIT PRINTING ~715    ◉ PERMIT PRINTING ~716

FORCED EXERCISE OF LEGAL RESTRICTION
    ◉ FORCEDLY EXERCISE        ○ NOT FORCEDLY EXERCISE
        ~717                       ~718

SETTING OF ADDITIONAL ITEMS
  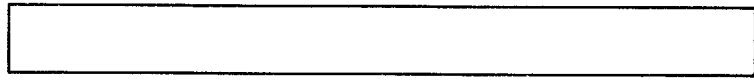 ~719

720 ~( TRANSMIT )              ( CANCEL )

FIG. 8

| GOODS NAME | MEMBER SHOP NAME | USING CONDITION ID | PRICE | CUSTOMER INFORMATION | |
|---|---|---|---|---|---|
| APPLE | CardHouse | 0003 | ¥100 | E-MAIL ADDRESS | ------ |
| 801 | 802 | 803 | 804 | 805 | |

FIG. 9

| USING CONDITION ID | SERVER ACCESS RIGHT | RELATIVE TERM | RELATIVE TERM UNIT | GENTLEMAN'S AGREEMENT APPLICATION | GENTLEMAN'S AGREEMENT ACT | FORCED EXERCISE | |
|---|---|---|---|---|---|---|---|
| 0003 | ABSENT | — | — | PERSONAL USE | PRINT, COPY | PRESENT | ------ |
| 901 | 902 | 903 | 904 | 905 | 906 | 907 | |

FIG. 24

| USER ID | PERSONAL USING CONDITION ID | GOODS NAME | MEMBER SHOP NAME | PURCHASE DATA | VALID TERM | USING CONDITION SITUATION | ... |
|---|---|---|---|---|---|---|---|
| ABCDE | 98110-5 | APPLE | Card House | 1998.01.10 | INDEFINITE | VALID | ... |
| 2401 | 2402 | 2403 | 2404 | 2405 | 2406 | 2407 | |

FIG. 25

| USER NAME | E-MAIL ADDRESS | ADDRESS | TEL NO. | ... |
|---|---|---|---|---|
| | kaoru@nerv.org | — | — | ... |
| 2501 | 2502 | 2503 | 2504 | |

FIG. 31

STOCK PRICES NEWS

AGREEMENT TO USE OF THE NEWS

/3101

COPYRIGHT OF
INFORMATION IS .....
PRINTING AND COPY OF
THE INFORMATION ARE .....
COMMERCIAL USE IS FULLY
INHIBITED .....

AGREE    DISAGREE 3102     3103

FIG. 32

STOCK PRICES NEWS

SETTLEMENT OF PURCHASE PRICE

KIND OF CARD       /3201
CARD NO.           /3202
VALID TERM         /3203
NAME OF CARD OWNER /3204

TRANSMIT  /3205   CANCEL

FIG. 35

| USER ID | PERSONAL USING CONDITION ID | GOODS NAME | MEMBER SHOP NAME | PURCHASE DATA | VALID TERM | USING CONDITION SITUATION |
|---|---|---|---|---|---|---|
| ABCDE | 98118-7 | DAILY STOCK PRICES INFORMATION OF 3-MONTH | STOCK PRICES NEWS | 1998.01.18 | 1998.04.17 | VALID |
| ...... | ...... | ...... | ...... | ...... | ...... | ...... |
| 3501 | 3502 | 3503 | 3504 | 3505 | 3506 | 3507 |

FIG. 36

| USER NAME | E-MAIL ADDRESS | ADDRESS | TEL NO. |
|---|---|---|---|
| KAORU NAGISA | kaoru@nerv.org | — | — |
| ...... | ...... | ...... | ...... |
| 3601 | 3602 | | |

FIG. 38

PERSONAL USING CONDITION LIST

PERSONAL USING CONDITIONS MS. KAORU NAGISA HAS NOW ARE AS FOLLOWS.

| MEMBER SHOP NAME | PERSONAL USING CONDITION ID | GOODS NAME | VALID TERM | ACCESSING METHOD |
|---|---|---|---|---|
| Cardhouse | 98110-5 | APPLE | INDEFINITE | DOWNLOAD |
| STOCK PRICES NEWS | 98118-7 | DAILY STOCK PRICES INFORMATION OF 3-MONTH | 1998.04.17 | READ |

3801, 3803, 3802, 3804, 3805, 3806, 3807, 3808, 3809, 3810

( RETURN )

CONTENTS SALES METHOD AND CYBER MALL SYSTEM USING SUCH METHOD AND STORAGE MEDIUM STORING THEREIN ITS CONTENTS SALES PROGRAM

BACKGROUND OF THE INVENTION

The present invention relates to a contents sales method, a cyber mall system using such a method, and a storage medium in which its contents sales program has been stored.

With a spread of the Internet, a cyber mall based on the World-Wide Web (WWW) becomes possible to be established. In the cyber mall, in addition to articles, digital contents are also sold at present. The digital contents indicate a kind of contents (work) such as image file, audio file, software, or Web page of the WWW which can be delivered via a network.

There are two kinds of purchasing methods of the digital contents. The first method is a method of delivering a copy of purchased digital contents to a computer of a customer. According to the purchasing method, since the digital contents are delivered via the network, there is a possibility that the delivery fails. When the delivery of the digital contents fails, usually, the customer needs to re-execute the purchasing process. In the case where the purchase price has been already paid, however, it is necessary to enable the purchasing process to be re-executed without paying the purchase price again.

For example, in ASCII Digital Novels from which a novel can be purchased in a document file on a chapter unit basis, when a download of the document file fails, if the customer re-purchases it within 72 hours after the purchase, the customer is not billed again.

Similarly, in "gu-mantanya" from which images can be purchased on a file unit basis, when the download of an image file fails, if the customer re-purchases it within 72 hours after the purchase, the customer is not billed again. The re-purchase can be executed up to three times only.

In "buydirect.com" from which software can be purchased on-line, when the download of software fails, if the customer re-purchases it within 30 days after the purchase, the customer is not billed again. Basically, the re-purchase can be executed up to three times only. When the re-purchase fails three times, if the customer informs customer service of such a fact, the number of times downloading can be made is increased.

According to the second method, the customer views the purchased digital contents via a WWW browser. According to such a purchasing method, when an access to a WWW page displaying the digital contents fails, the digital contents cannot be viewed. If the digital contents are, however, those of a regular subscription type like a subscription of a news service, there is no additional charge even if the contents are viewed again.

SUMMARY OF THE INVENTION

According to the conventional techniques, in a procedure for re-purchasing digital contents when the delivery of the digital contents fails, the number of times the re-delivery can be executed and a period during which the re-purchase can be performed are limited, which creates problems for the customer.

It is an object of the present invention to provide a cyber mall system in which even if a delivery of purchased digital contents fails, at the time of re-purchase of the digital contents, the digital contents are delivered again only by selecting the digital contents in which the re-delivery is desired without re-paying a goods price and re-inputting customer information.

In order to solve the above problems, first, using conditions of digital contents are provided. The using conditions of the digital contents denote restricting conditions of an access to the digital contents main body and matters that require attention upon access.

As restricting conditions of access to the digital contents, there are an access control on a cyber mall server side and a physical act restriction on a cyber mall client side. For example, in the access control on the cyber mall server side, the period and number of times of accesses to the purchased digital contents are limited. As a physical act restriction on the cyber mall client side, there is an act which can be performed to the digital contents, for example, an act restriction which can be forcedly controlled on the cyber mall client side for printing and copying.

As matters that require attention upon access to the digital contents, there is a logical act control restriction on the cyber mall client side. The logical act control restriction on the cyber mall client side includes matters that require attention regarding the use of the digital contents, for example, an act restriction for a secondary use or a commercial use which cannot be controlled on the cyber mall client side and can be executed only by the law (that is, gentleman's agreement).

A value that the customer pays when the customer purchases the digital contents is associated with the digital contents. As a value, there are not only payment of a goods price of the digital contents but also an input of customer information and an approval to a contract regarding the use of the digital contents. For example, as customer information, there are a name and an electronic mail address as personal information of the customer. The contract regarding the use of the digital contents is an agreement by which the customer agrees to follow a copyright of the digital contents and the using conditions of the digital contents.

The using conditions and value are set together with goods attributes when a shop manager of a cyber shop defines the digital contents as goods. By registering different using conditions and different values for certain digital contents, one digital contents can be provided as a plurality of goods.

Further, when the cyber mall server sells the digital contents, in addition to information of the goods to be sold and information of the customer, a digital contents customer generates and accumulates personal using conditions as a certificate showing that the digital contents customer purchased the digital contents on the basis of information in which variable portions of the using conditions and value are replaced to definite values.

After the personal using conditions were generated, the cyber mall server delivers a copy of the sold digital contents to the cyber mall client. When a physical act restriction on the cyber mall client side is defined in the digital contents, the physical act restriction is built in the digital contents and resultant digital contents are delivered.

All of the using conditions of the digital contents and the personal using conditions are managed on the cyber mall server side.

When the delivery of the digital contents fails, the digital contents customer re-purchases the digital contents. The cyber mall server retrieves the personal using conditions generated for the digital contents which the digital contents customer desires to re-purchase. When the digital contents customer has valid personal using conditions of the digital contents to be re-purchased, the cyber mall server re-delivers a copy of the digital contents to the cyber mall client without re-collecting the value of the digital contents.

BRIEF DESCRIPTION OF THE DRAWINGS

FIG. 3 is an association diagram of digital contents using conditions;

FIG. 6 is a diagram showing a picture for definition of the digital contents goods;

FIG. 7 is a diagram showing a picture for definition of the digital contents using conditions;

FIG. 8 is a diagram showing an entry of a generated digital contents goods management table;

FIG. 9 is a diagram showing an entry of a generated digital contents using condition definition table;

FIG. 24 is a diagram showing an entry of a generated personal using condition table;

FIG. 25 is a diagram showing an entry of a generated customer information management table;

FIG. 31 is a diagram showing an example of a picture for display of an agreement of using conditions of a purchase news service;

FIG. 32 is a diagram showing an example of a picture for settlement of a news service purchase price;

FIG. 35 is a diagram showing an entry of a generated personal using condition table;

FIG. 36 is a diagram showing an entry of a generated customer information management table;

FIG. 38 is a diagram showing an example of a picture of a purchased personal using condition list.

DESCRIPTION OF THE PREFERRED EMBODIMENTS

An embodiment of the invention will now be described in detail hereinbelow.

Figure 1:
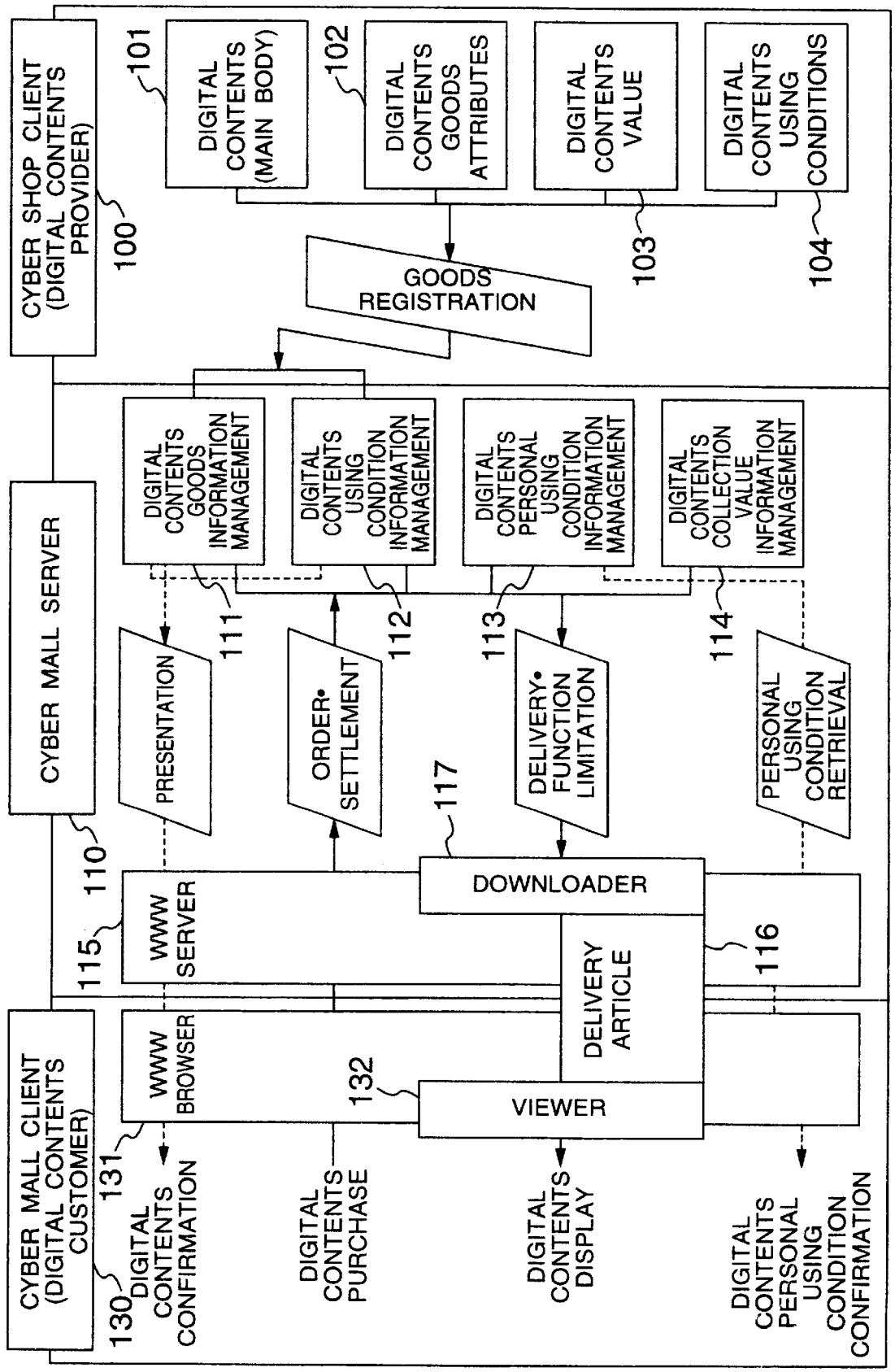
FIG. 1 is a constructional diagram of a digital contents sales cyber mall system of an embodiment.

FIG. 1 is a block diagram showing a construction of a digital contents sales cyber mall system according to the embodiment of the invention. Reference numeral 100 denotes a cyber shop client; and 110 a cyber mall server; 130 a cyber mall client. Reference numeral 101 denotes digital contents; 102 digital contents goods attributes as goods attributes of the digital contents 101; 103 a digital contents value as a value of the digital contents 101; and 104 digital contents using conditions as using conditions of the digital contents 101. The digital contents goods attributes 102, digital contents value 103, and digital contents using conditions 104 are defined when the cyber shop client 100 registers goods of the digital contents 101 into the cyber mall server 110.

Reference numeral 111 denotes a digital contents goods information management to manage goods information of the digital contents 101; 112 a digital contents using condition information management to manage using condition information of the digital contents 101; 113 a digital contents personal using condition information management to manage personal using condition information which is allocated to a customer of the digital contents 101; 114 a digital contents collection value information management to manage the digital contents value 103 which is collected at the time of sales of the digital contents 101; 115 a WWW server; 116 a delivery article in which physical act restriction information of the digital contents 101 has been built in the digital contents 101; and 117 a downloader to generate a delivery article. Reference numeral 131 denotes a WWW browser and 132 indicates a viewer to display the delivery article 116. The viewer 132 is controlled by the physical act restriction information of the digital contents 101 built in the delivery article 116.

Figure 2:
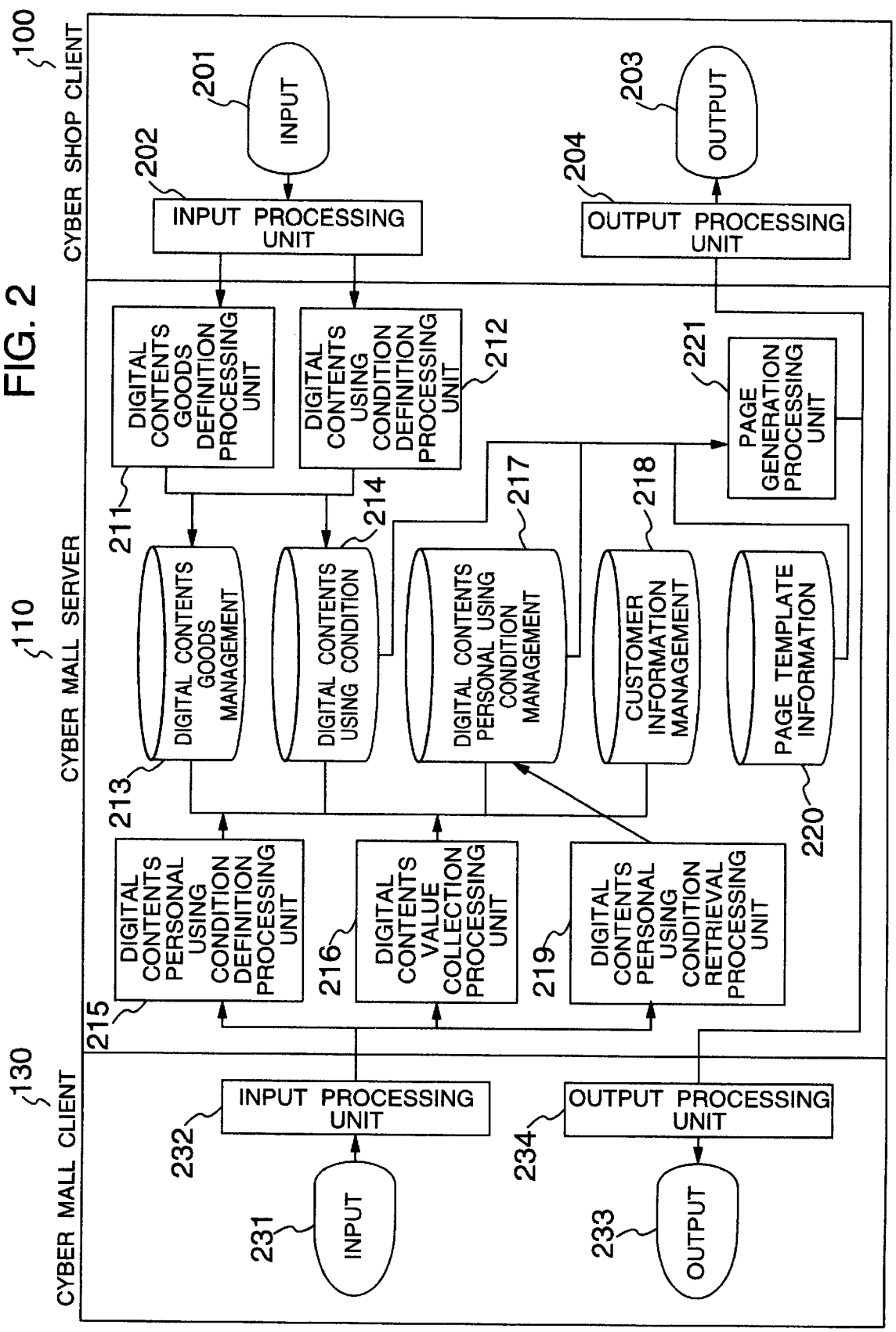
FIG. 2 is a relation diagram of a processing unit of the digital contents sales cyber mall system of the embodiment and a management table.

FIG. 2 is a block diagram showing the relation between a processing unit of the digital contents sales cyber mall system as an embodiment of the invention and a management table. Reference numeral 100 denotes the cyber shop client; 201 an input apparatus of the cyber shop client 100; 202 an input processing unit for processing an input from the input apparatus 201; 203 an output apparatus of the cyber shop client 100; and 204 an output processing unit for processing an output to the output apparatus 203.

Reference numeral 110 denotes the cyber mall server; 211 a digital contents goods definition processing unit to define the digital contents goods attributes 102 and digital contents value 103; 212 a digital contents using condition definition processing unit to define the digital contents using conditions 104; 213 a digital contents goods management table to accumulate goods definition information of the digital contents 101; 214 a digital contents using condition table to accumulate the digital contents using conditions 104; 215 a digital contents personal using condition definition processing unit to generate personal using conditions of the digital contents 101; 216 a digital contents value collection processing unit to collect the digital contents value 103; 217 a digital contents personal using condition management table to accumulate the personal using conditions of the digital contents 101; 218 a customer information management table to accumulate digital contents customer information as one of the digital contents value 103; 219 a digital contents personal using condition retrieval processing unit to retrieve the digital contents personal using condition management table 217; 220 a page template information table to accumulate a page template to generate an input/output page; and 221 a page template processing unit to generate the input/output page from the page template information table 220.

Reference numeral 130 denotes the cyber mall client; 231 an input apparatus of the cyber mall client 130; 232 an input processing unit for processing an input from the input apparatus 231; 233 an output apparatus of the cyber mall client 130; and 234 an output processing unit to process an output to the output apparatus 233.

FIG. 3 is a diagram showing an example of a dependency relation among the digital contents using conditions 104. Reference numeral 300 denotes an access control on the cyber mall server 110 side; 310 a physical act restriction on the cyber mall client 130 side; and 320 a logical act restriction on the cyber mall client 130 side.

As an access control 300 on the cyber mall server 110 side, there is an access period control 301 for the purchased digital contents 101. In this example, either a mode to limit an access period or a mode without a period limitation can be selected. As a physical act restriction 310 on the cyber mall client 130 side, there are an "execute" 311 as an act which can be performed in a browser non-display type contents such as software or the like, "replay" 313 as an act which can be performed in a stream type contents; "view" 312 as an act which can be performed in the browser display type contents such as an image file or the like, "print" 314, "save" 315, and "cut and paste" 316. A dependency relation of the acts which can be performed in the browser display type contents is as follows. The "view" 312 is a prerequisite condition as for the "print" 314 and "save" 315, respectively. That is, unless there is an authority to see the digital contents 101, the digital contents 101 cannot be printed and saved. The "save" 315 is a prerequisite condition as for the "cut and paste" 316. That is, unless there is an authority to save the digital contents 101, the digital contents 101 cannot be cut and pasted.

The logical act restriction 320 on the cyber mall client 130 side comprises an application 321 and an act 325. The application 321 is a use object of the digital contents 101 and includes a commercial use 322 and a personal use 323. The act 325 is an act which is executed for the digital contents 101 and includes "sales delivery" 326, "copy" 327, "adapt" 328, and "print" 329. A dependency relation between the physical act restriction 310 on the cyber mall client 130 side and the logical act restriction 320 on the cyber mall client 130 side is as follows. The "copy" 327 is a prerequisite condition as for "adapt" 328. That is, unless there is an authority to copy the digital contents 101, the digital contents 101 cannot be processed. The "save" 315 is a prerequisite condition as for the "copy" 327. That is, unless there is an authority to save the digital contents 101, the digital contents 101 cannot be copied. The "cut and paste" 316 is a prerequisite condition as for the "adapt" 328. That is, unless there is an authority to cut and paste the digital contents 101, the digital contents 101 cannot be processed.

Figure 4:
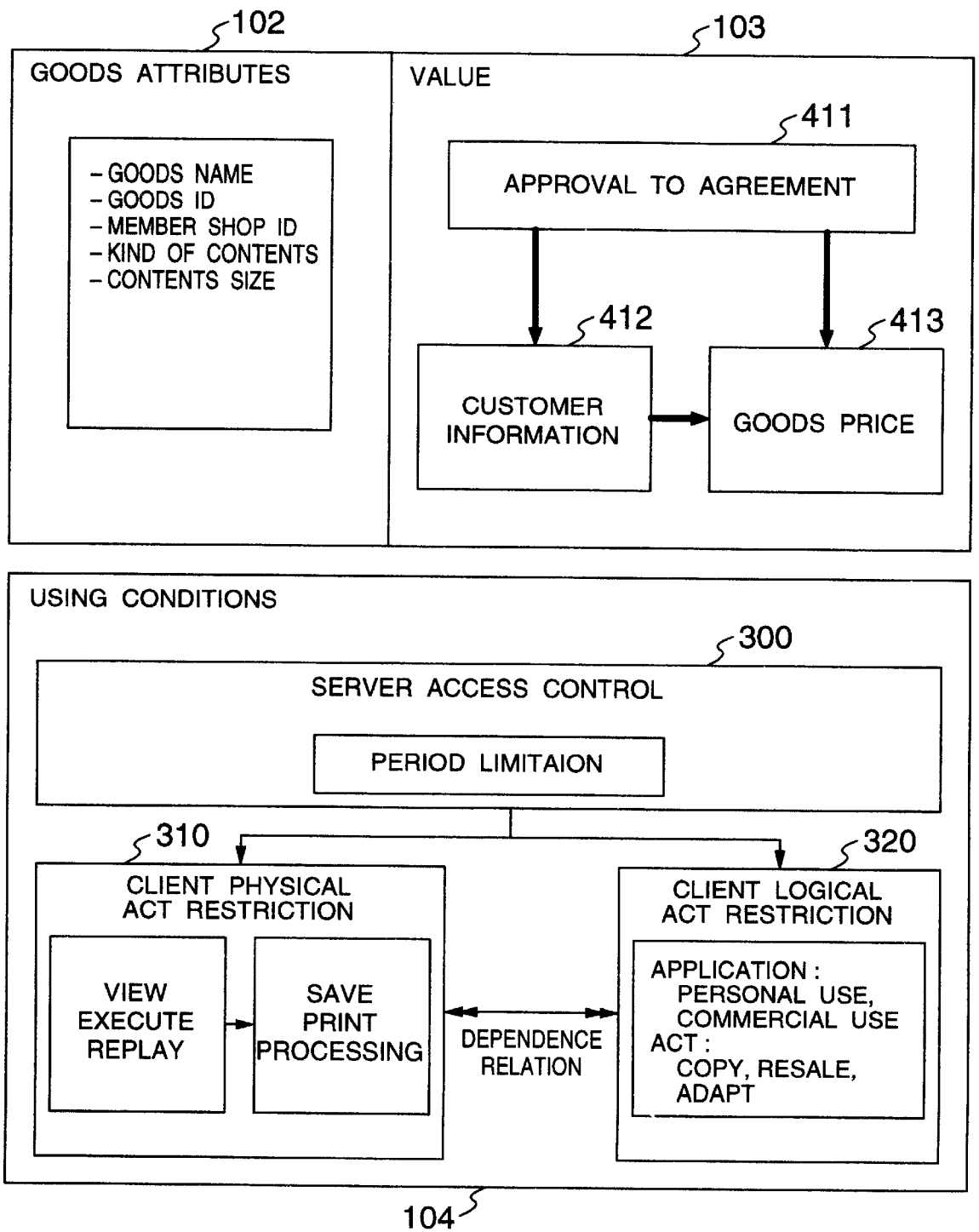
FIG. 4 is an association diagram of digital contents goods definition attributes.

FIG. 4 is a diagram showing an example of the relation among the attributes which are defined when the digital contents 101 are registered as goods into the cyber mall server 110. Reference numeral 102 denotes the digital contents goods attributes; 103 the digital contents value; and 104 the digital contents using conditions. As digital contents goods attributes 102, for example, there are a goods name of the digital contents 101 and the kind of digital contents 101. As a digital contents value 103, here are an approval 411 to an agreement of the digital contents using conditions as a contract regarding the use of the digital contents 101, digital contents customer information 412 as personal information (for example, a name and an electronic mail address) of the customer of the digital contents 101, and a goods price 413 of the digital contents 101. The digital contents using conditions 104 comprise the access control 300 on the cyber mall server 110 side, the physical act restriction 310 on the cyber mall client 130 side, and the logical act restriction 320 on the cyber mall client 130 side.

The digital contents 101 are registered as one goods by a combination of the digital contents goods attributes 102, digital contents value 103, and digital contents using conditions 104. Therefore, even if the digital contents goods attributes 102 are the same, by defining the different digital contents value 103 or digital contents using conditions 104, the digital contents 101 can be registered as a plurality of goods.

Figure 5:
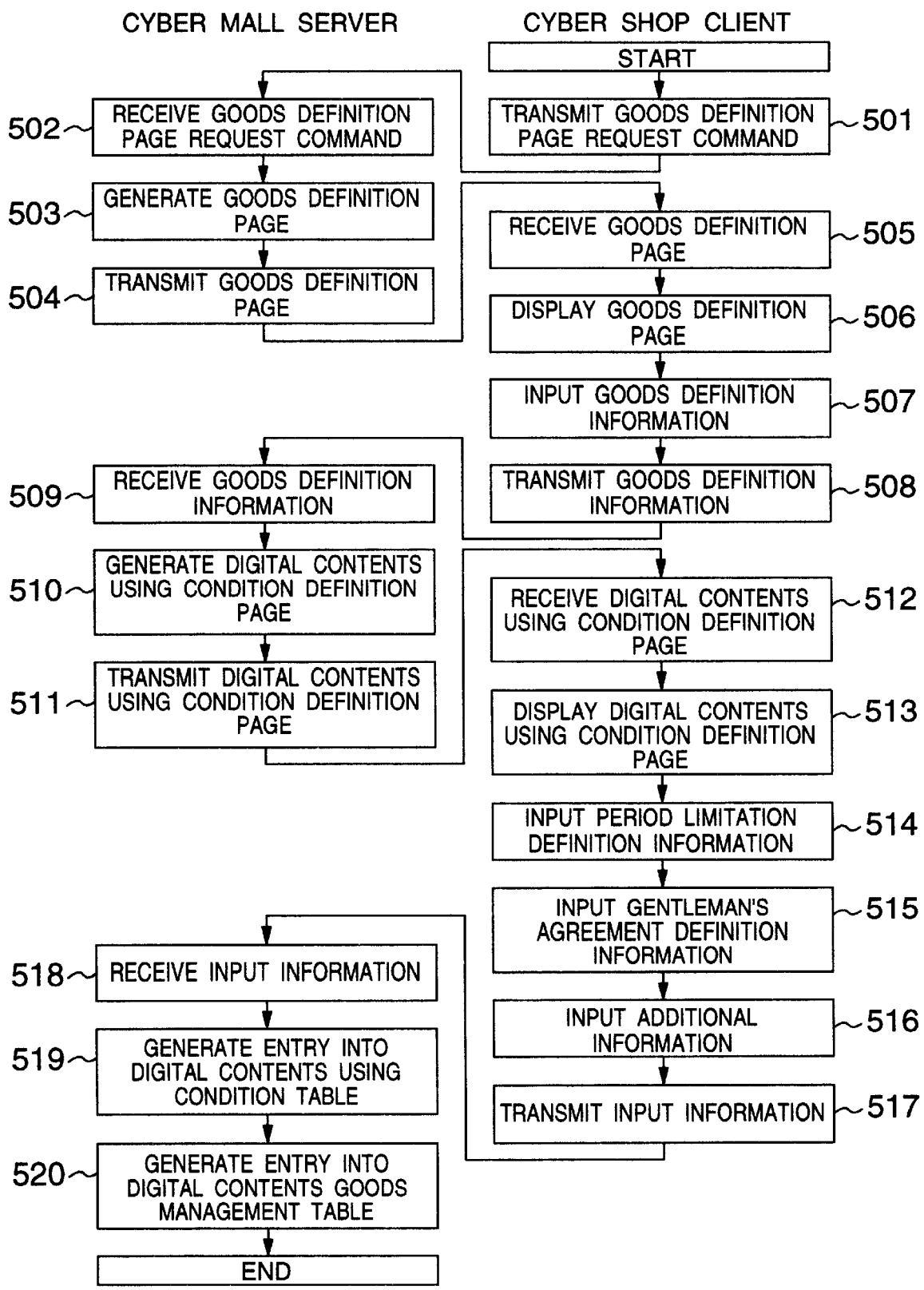
FIG. 5 is a diagram showing steps at the time of definition of digital contents goods.

A goods defining step of the digital contents 101 will now be described with reference to a flowchart of FIG. 5. The goods defining step is as follows. In the embodiment, it is now assumed that the shop manager interactively inputs the goods definition by using the cyber shop client 100.

First, the cyber shop client 100 transmits a goods definition page request command to the cyber mall server 110 (501). The cyber mall server 110 receives the goods definition page request command (502) and generates a goods definition page (503) and, thereafter, transmits the goods definition page to the cyber shop client 100 (504). After the goods definition page was received (505), the cyber shop client 100 displays the goods definition page (506). FIG. 6 shows an example of the goods definition page.

The shop manager inputs goods definition information of the digital contents 101 by using the goods definition page (507). In the goods definition page, definition information of the digital contents goods attributes 102 and digital contents value 103 are inputted. In the embodiment, it is assumed that an image file of an apple is registered as goods. "apple" is set as a goods name 601 as digital contents goods attributes 102. "¥100" is set as a goods price 602 serving as a goods price 413 of the digital contents 101. An electronic mail address 604 is set as digital contents customer information 412. "necessary" 608 is set as an approval 411 of the agreement.

After completion of the input, by pressing a transmission button 610, the cyber shop client 100 transmits the goods definition information to the cyber mall server 110 (508). The cyber mall server 110 receives the goods definition information (509), generates a digital contents using condition definition page (510), and thereafter, transmits the digital contents using condition definition page to the cyber shop client 100 (511). After the digital contents using condition definition page was received (512), the cyber shop client 100 displays the digital contents using condition definition page (513). FIG. 7 shows an example of the digital contents using condition definition page.

The shop manager inputs the digital contents using conditions 104 by using the digital contents using condition definition page. First, the access control 300 on the cyber mall server 110 side is set (514). In the period setting, there are three kinds of periods comprising a relative term 701, an absolute term 702, and non-limitation 703. In the relative term 701, a period of time during which it is possible to access to the digital contents 101 from the purchase date of the digital contents 101. In the absolute term 702, the last date when it is possible to access to the purchased digital contents 101 is set. When the period setting is not provided, the non-limitation 703 is selected. In this example, the non-limitation 703 is selected.

Subsequently, the logical act restriction 320 of the digital contents on the cyber mall client 130 side is set (515). First, as an expressing method of the digital contents 101, any one of "view" 704, "execute" 705, and "replay" 706 is selected. The "view" 704 is selected in case of the browser non-display type contents. The "execute" 705 is selected in case of the browser display type contents. The "replay" 706 is selected in case of the stream type contents. In the embodiment, the "view" 704 is selected because the goods to be registered are an image file.

Either a personal use 707 or a commercial use 708 is now selected as an application permission of the digital contents 101. In case of personally using the digital contents 101, the personal use 707 is selected. In case of commercially using the digital contents 101, the commercial use 708 is selected. In this example, the personal use 707 is selected.

As a use permission range of the digital contents 101, a relevant item is selected from "inhibit sales delivery (commercial use) 709, "permit sales delivery (commercial use) 710, "inhibit copy" 711, "permit copy" 712, "inhibit processing" 713, "permit processing" 714, "inhibit printing" 715, and "permit printing" 716. In this example, the "inhibit sales delivery (commercial use) 709, "permit copy" 712, "inhibit processing" 713, and "permit printing" 716 are selected.

The presence or absence of the forced exercise of the logical act restriction 320 on the cyber mall client 130 side is subsequently set. Either "forcedly exercise" 717 or "not forcedly exercise" 718 is selected here. When the "forcedly exercise" 717 is selected, the physical act restriction 310 on the cyber mall client 130 side which is not contradictory to the logical act restriction 320 on the cyber mall client 130 side which was set is set. In this example, the "forcedly exercise" 717 is selected.

Finally, additional items are set (516). In case of setting using conditions other than the foregoing selection items, additional using conditions are inputted to the additional items 719.

When a transmission button 720 is pressed after completion of the input, the cyber shop client 100 transmits the input information to the cyber mall server 110 (517). The cyber mall server 110 receives the input information (518). The digital contents using condition definition processing unit 212 generates an entry into the digital contents using condition table 214 (519). The digital contents goods definition processing unit 211 generates an entry into the digital contents goods management table 213 (520).

FIG. 8 is an example of an entry of the digital contents goods management table 213. As typical fields of the table, there are: a goods name 801 of the digital contents; a member shop ID 802 as an ID of the cyber shop; a using condition ID 803 as an identifier of the using conditions defined for the digital contents 101; a price 804 as a goods price 413 of the digital contents 101; and customer information 805 as digital contents customer information 412.

In this example, "apple" of the goods name 601 inputted by the shop manager by using the goods definition page in FIG. 6 is allocated to the goods name 801. The ID of the cyber shop is allocated to the member shop ID 802. A using condition ID 901 which is automatically given in the digital contents using condition table 214 is allocated to the using condition ID 803. "¥100" of the goods price 602 inputted by the shop manager by using the goods definition page in FIG. 6 is allocated to the price 804. "electronic mail address" of 604 is allocated to the customer information 805.

FIG. 9 shows an example of an entry in the digital contents using condition table 214. As typical fields of the table, there are: the using condition ID 901 as an identifier of the using conditions defined for the digital contents 101; a server access right 902 showing the presence or absence of the access control which is performed on the cyber mall server 110 side; a relative term 903 as a term in the case where a relative access period control is executed on the cyber mall server 110 side; a relative term unit 904 as a unit (for example, month or day) of the relative term; a gentleman's agreement application 905 as an application which is defined by the logical act restriction 320 on the cyber mall client side; a gentleman's agreement act 906 which is defined by the logical act restriction 320 on the cyber mall client side and is an act which can be performed for the digital contents 101; and a forced exercise 907 showing the presence or absence of the physical act restriction 310 on the cyber mall client side.

In this example, the using condition ID 901 is automatically given by the using condition processing unit. The non-limitation 703, personal use 707, copy 712, printing 716, and forcedly exercise 717 which were inputted by the shop manager by using the using condition definition picture plane in FIG. 7 are allocated to the server access right 902, gentleman's agreement application 905, gentleman's agreement act 906, and forced exercise 907, respectively. Since non-limitation 703 has been set for the server access right 902, nothing is allocated to the relative term 903 and relative term unit 904.

Figure 10:
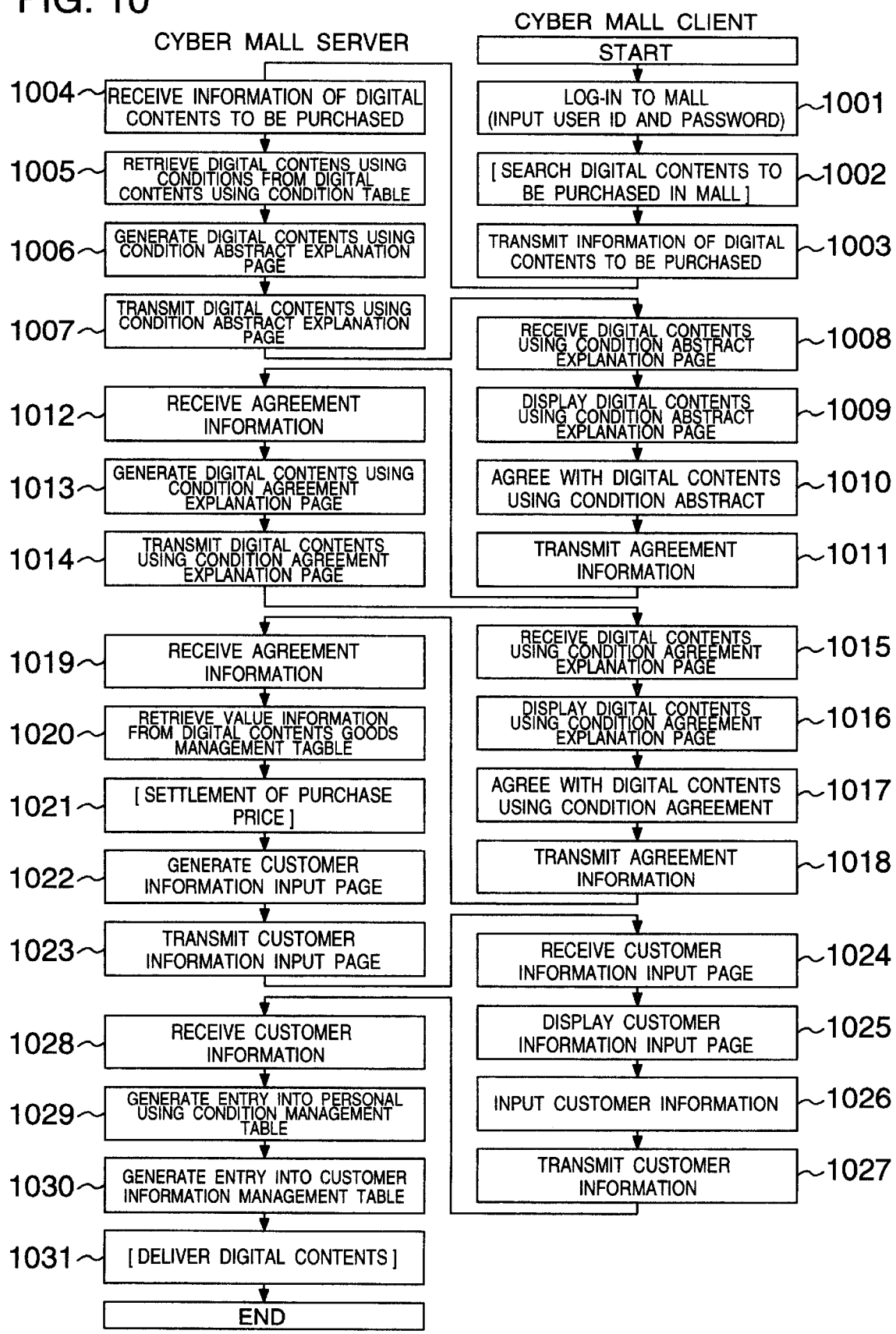
FIG. 10 is a diagram showing steps of purchasing digital contents.

A step of purchasing the digital contents 101 will now be described with reference to a flowchart of FIG. 10. In this embodiment, it is assumed that the customer purchases the image file of the apple which has been registered as goods in the flowchart of FIG. 5 by using the cyber mall client 130. The purchasing step is as follows.

Figure 14:
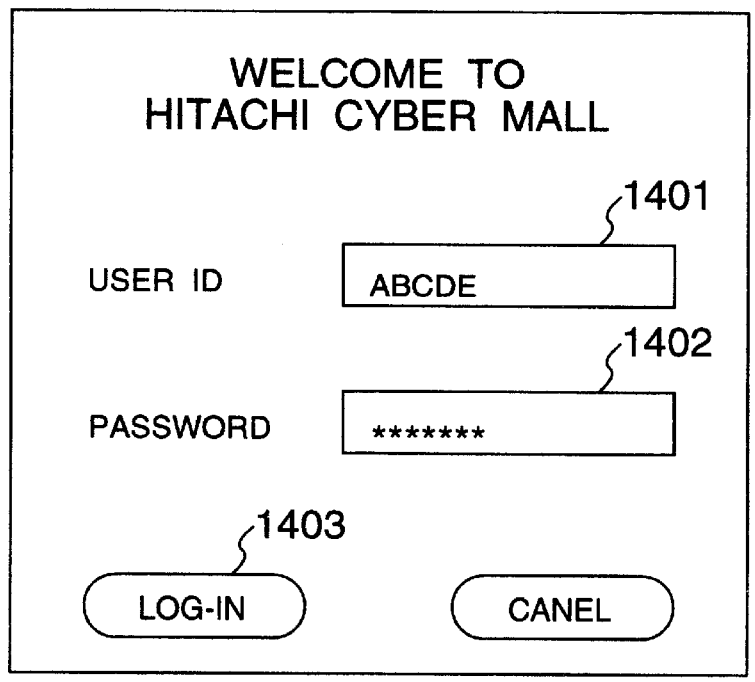
FIG. 14 is a diagram showing an example of a picture for log-in of a cyber mall.

First, the customer performs a log-in to the cyber mall (1001). FIG. 14 is an example of a log-in picture plane. At the time of log-in, after a user ID 1401 and a password 1402 were inputted, a log-in button 1403 is pressed.

Figure 11:
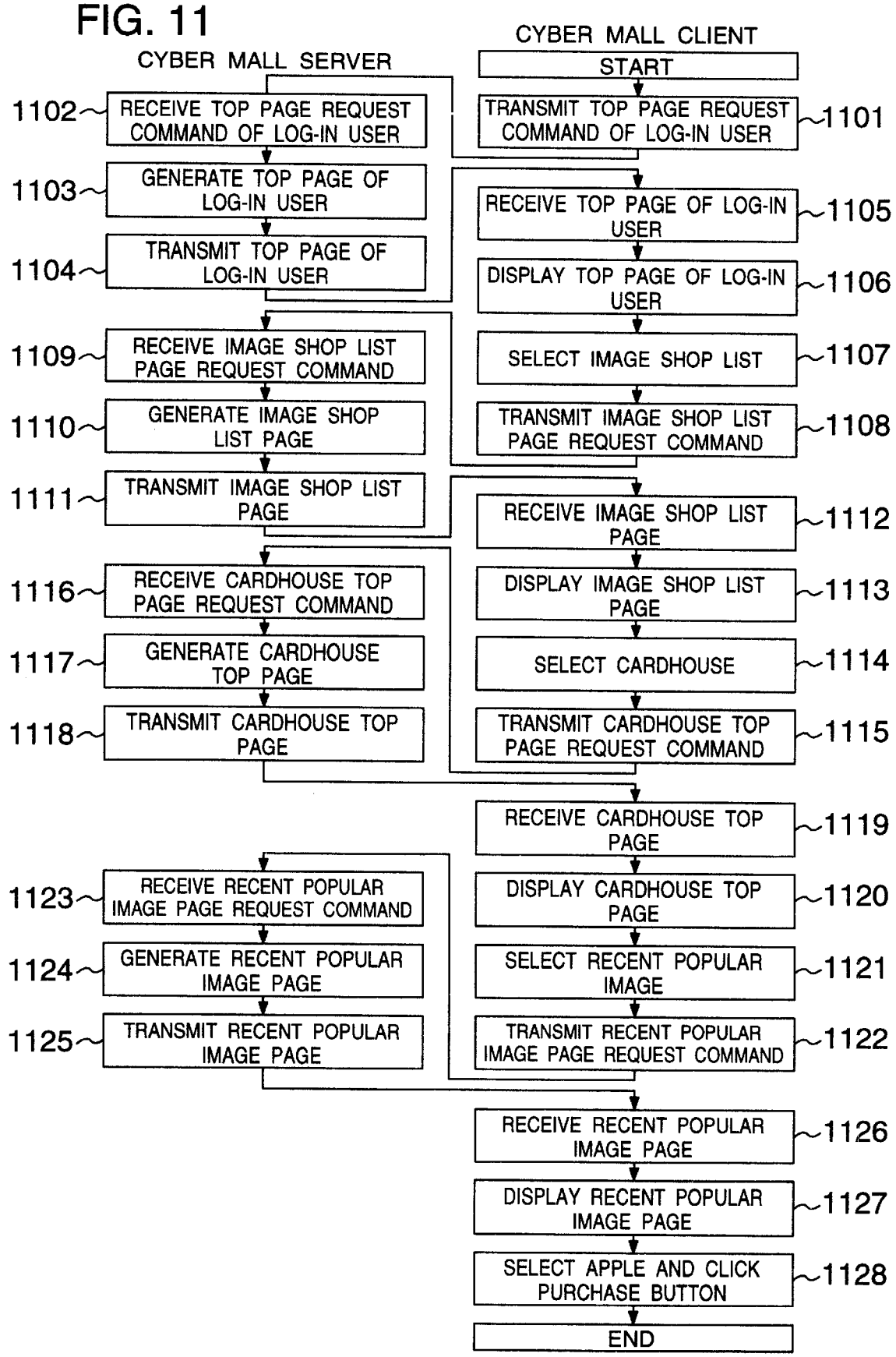
FIG. 11 is a diagram showing steps of searching an image file to be purchased.

After the log-in, the digital contents 101 to be purchased in the mall is searched (1002). FIG. 11 is a flowchart showing detailed processes in step 1002.

Figure 15:
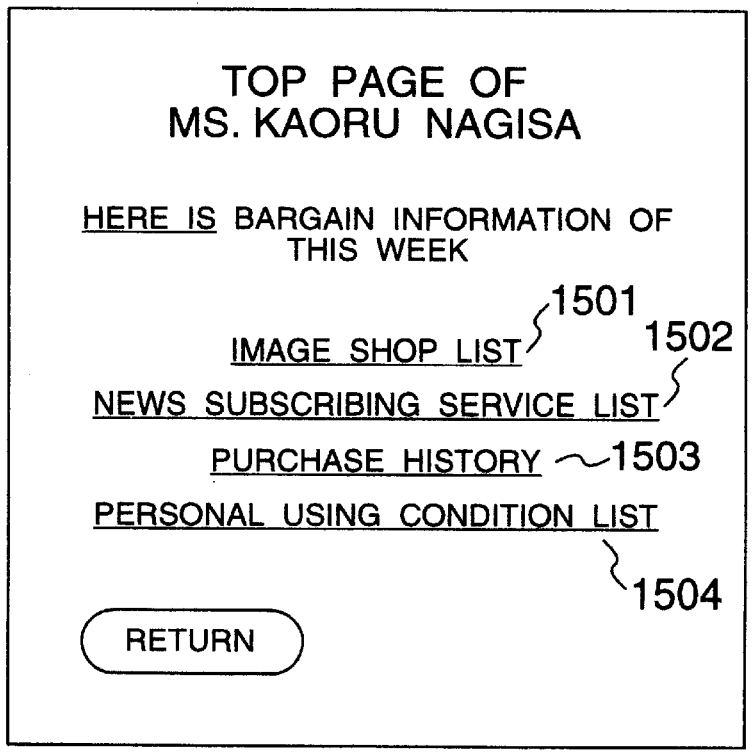
FIG. 15 is a diagram showing an example of a picture of a log-in user top page.

The cyber mall client 130 transmits a top page request command of the log-in user as a customer to the cyber mall server 110 (1101). The top page is a page of the log-in user himself/herself which is first displayed after the log-in to the cyber mall was performed. The cyber mall server 110 receives the top page request command of the log-in user (1102), generates the top page of the log-in user (1103), and after that, transmits the top page of the log-in user to the cyber mall client 130 (1104). After the top page of the log-in user was received (1105), the cyber mall client 130 displays the top page of the log-in user (1106). FIG. 15 shows an example of the top page for the log-in user.

Figure 16:
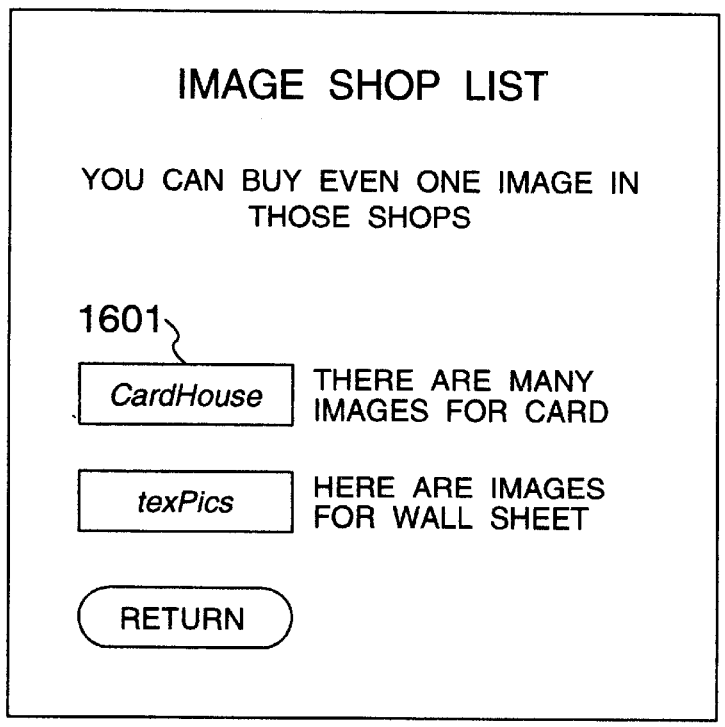
FIG. 16 is a diagram showing an example of a picture of an image shop list.

In the embodiment, since the image file is purchased, in this page, the log-in user selects an image shop list 1501 (1107). The cyber mall client 130 transmits an image shop list page request command to the cyber mall server 110 (1108). The cyber mall server 110 receives the image shop list page request command (1109), generates an image shop list page (1110), and thereafter, transmits the image shop list page to the cyber mall client 130 (1111). After the image shop list page was received (1112), the cyber mall client 130 displays the image shop list page (1113). FIG. 16 shows an example of the top page for the log-in user.

Figure 17:
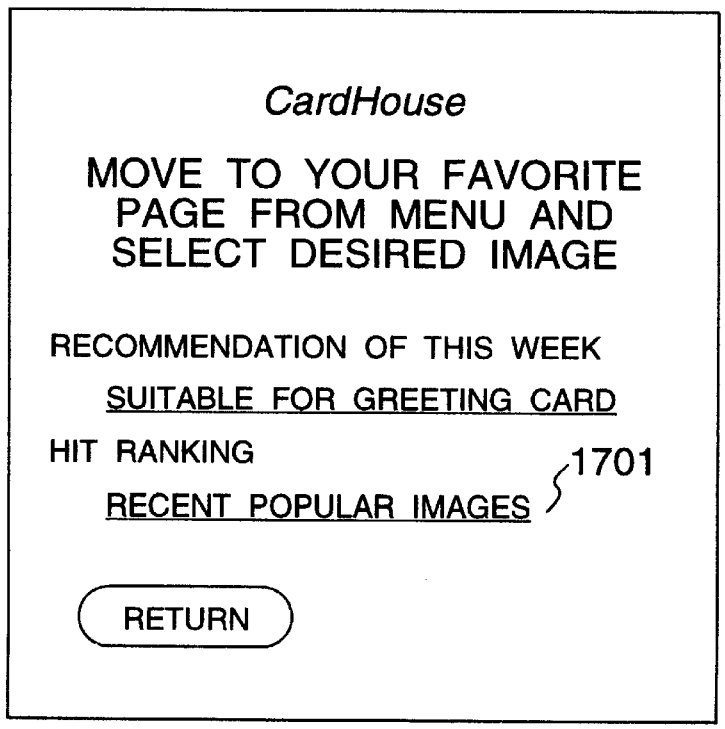
FIG. 17 is a diagram showing an example of a picture of an image shop top page.

In this page, one image shop is selected from the image shop list. The log-in user selects an image shop CardHouse 1601 (1114). The cyber mall client 130 transmits a Card-House top page request command to the cyber mall server 110 (1115). The cyber mall server 110 receives the Card-House top page request command (1116), generates a Card-House top page (1117), and thereafter, transmits the Card-House top page to the cyber mall client 130 (1118). After the CardHouse top page was received (1119), the cyber mall client 130 displays the CardHouse top page (1120). FIG. 17 shows an example of the CardHouse top page.

Figure 18:
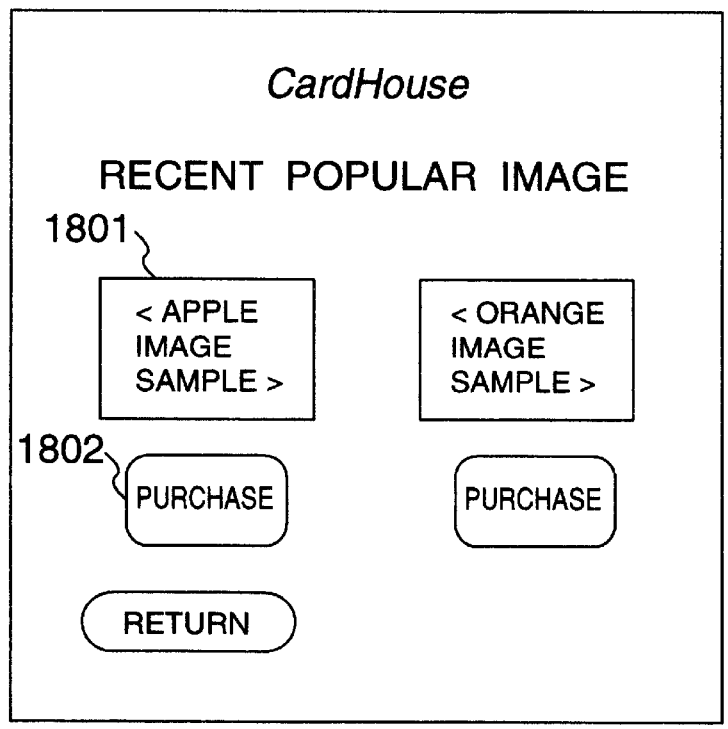
FIG. 18 is a diagram showing an example of a picture of an image list.

In this page, one menu is selected to search an image file to be purchased. The log-in user selects a recent popular image 1701 (1121). The cyber mall client 130 transmits a request command of the recent popular image page to the cyber mall server 110 (1122). The cyber mall server 110 receives the recent popular image page request command (1123), generates a recent popular image page (1124), and thereafter, transmits the recent popular image page to the cyber mall client 130 (1125). After the recent popular image page was received (1126), the cyber mall client 130 displays the recent popular image page (1127). FIG. 18 shows an example of the recent popular image page.

In this page, one image to be purchased is selected. The log-in user presses a purchase button 1802 below an image 1801 of an apple to be purchased (1128). In this manner, the processes of the flowchart of FIG. 11 are finished.

The cyber mall client 130 transmits information of the digital contents 101 to be purchased by the log-in user to the cyber mall server 110 (1003). The cyber mall server 110 receives the information of the digital contents 101 to be purchased by the log-in user (1004) and retrieves the digital contents using conditions 104 from the digital contents using condition table 214 on the basis of the received information (1005).

Figure 19:
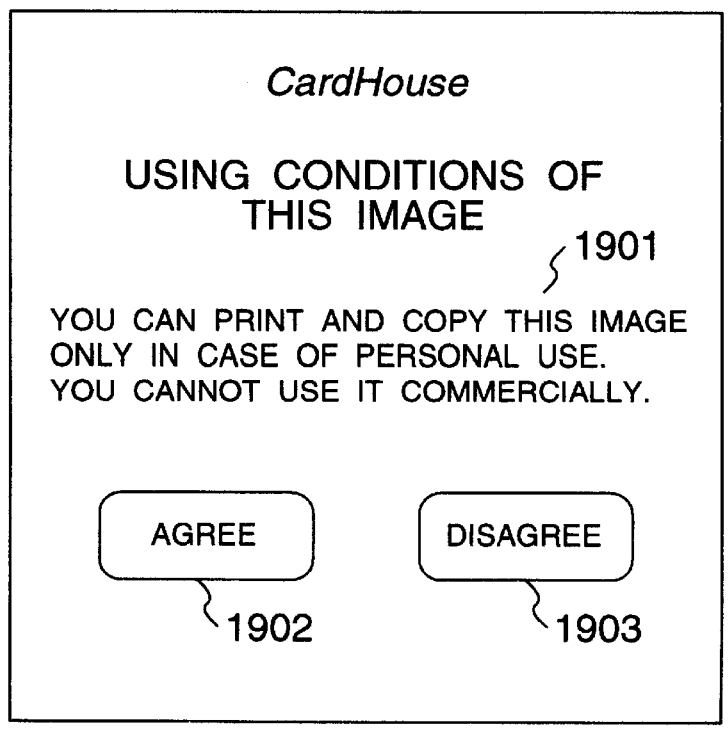
FIG. 19 is a diagram showing an example of a picture for display of an abstract of using conditions of a purchase image.

The cyber mall server 110 generates a page to explain an abstract of the digital contents using conditions on the basis of the digital contents using conditions 104 (1006) and, after that, transmits the digital contents using condition abstract explanation page to the cyber mall client 130 (1007). After the digital contents using condition abstract explanation page was received (1008), the cyber mall client 130 displays the digital contents using condition abstract explanation page (1009). FIG. 19 shows an example of the digital contents using condition abstract explanation page.

The log-in user reads an abstract 1901 of the using conditions of an image to be purchased and presses an agree button 1902 if he/she agrees with the using conditions (1010). If the log-in user does not agree, he/she clicks a refuse button 1903 and finishes the processes.

Figure 20:
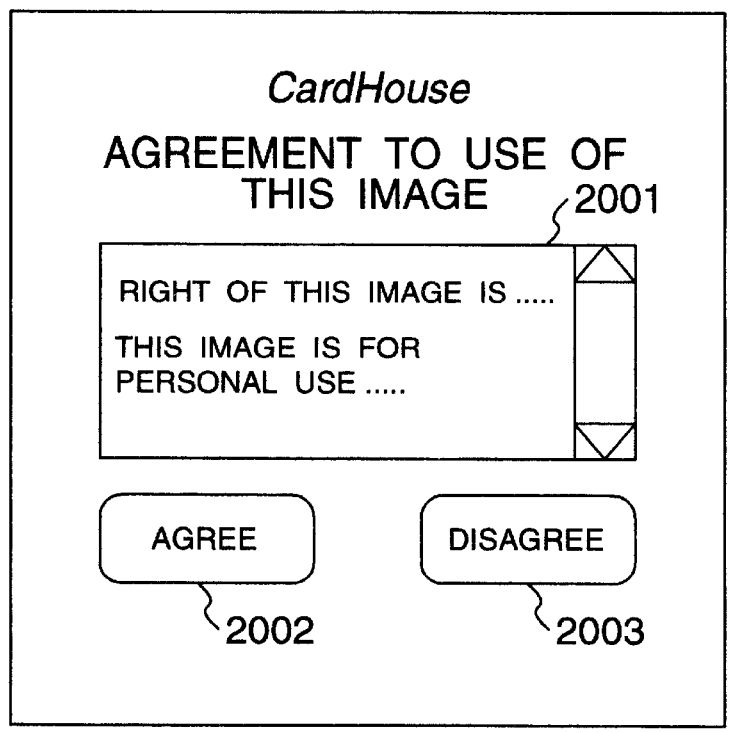
FIG. 20 is a diagram showing an example of a picture for display of an agreement of using conditions of a purchase image.

When the agree button 1902 is pressed, the cyber mall client 130 transmits a message showing that the log-in user agreed with the abstract 1901 of the using conditions to the cyber mall server 110 (1011). After agreement information was received (1012), the cyber mall server 110 generates a digital contents using condition agreement explanation page (1013) on the basis of the digital contents using conditions 104 and, after that, transmits the digital contents using condition agreement explanation page to the cyber mall client 130 (1014). After the digital contents using condition agreement explanation page was received (1015), the cyber mall client 130 displays the digital contents using condition agreement explanation page (1016). FIG. 20 shows an example of the digital contents using condition agreement explanation page.

The log-in user reads an agreement 2001 of the using conditions of an image to be purchased and presses an agree button 2002 (1017) if he/she agrees with the contents of the agreement. If the log-in user does not agree, he/she clicks a refuse button 2003 and finishes the processes.

Figure 12:
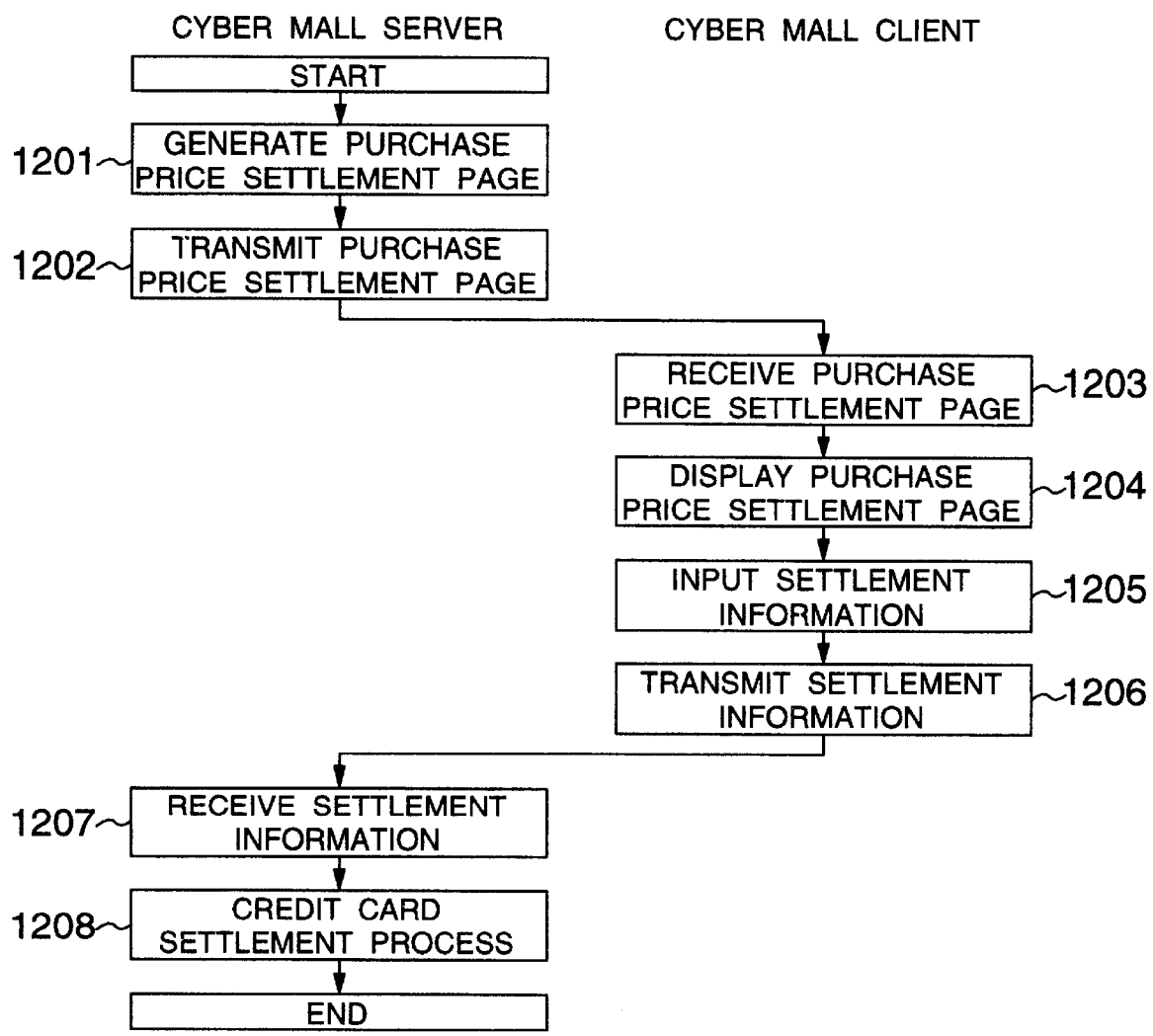
FIG. 12 is a diagram showing steps for a purchase price settlement process.

When the agree button 2002 is pressed, the cyber mall client 130 transmits a message showing that the log-in user agreed with the agreement 2001 of the using conditions to the cyber mall server 110 (1018). After agreement information was received (1019), the cyber mall server 110 retrieves the goods price 413 of the digital contents and the digital contents customer information 412 from the digital contents goods management table 213 (1020). The digital contents value collection processing unit 216 settles the purchase price on the basis of the goods price 413 of the digital contents (1021). FIG. 12 is a flowchart showing a detailed process in step 1020. In the embodiment, a settlement is performed by using a credit card.

Figure 21:
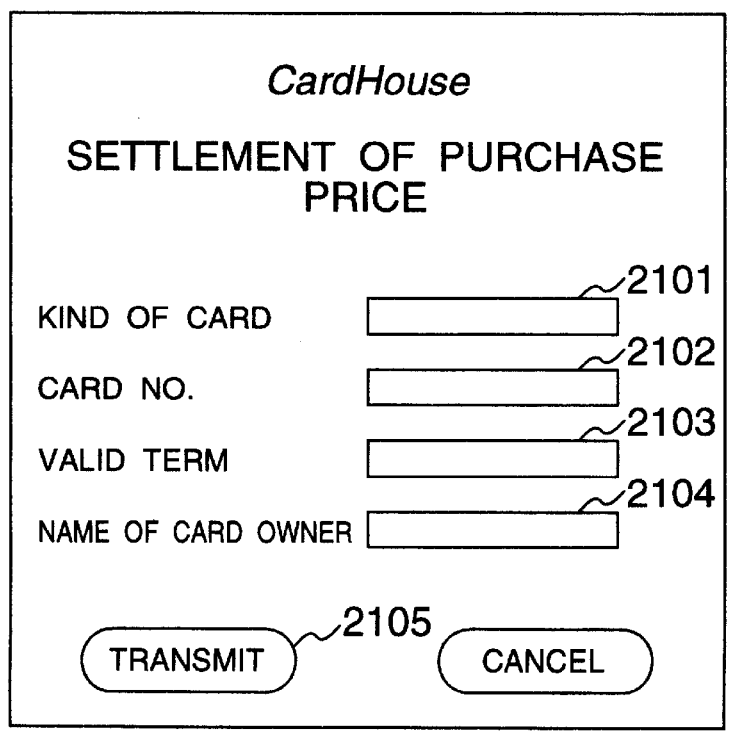
FIG. 21 is a diagram showing an example of a picture for settlement of an image purchase price.

The cyber mall server 110 generates a purchase price settlement page (1201) and transmits the purchase price settlement page to the cyber mall client 130 (1202). After the purchase price settlement page was received (1203), the cyber mall client 130 displays the purchase price settlement page (1204). FIG. 21 shows an example of the purchase price settlement page.

On the purchase price settlement page, the log-in user inputs a kind of credit card 2101, a credit card number 2102, a valid term 2103 of the credit card, and a name of card owner 2104 and presses a settlement button 2105 (1205). When the settlement button 2105 is pressed, the cyber mall client 130 transmits settlement information inputted to the cyber mall server 110 (1206). After the settlement information was received (1207), the cyber mall server 110 executes a settlement process of the credit card (1208). In this manner, the processes of the flowchart of FIG. 12 are finished.

Figure 22:
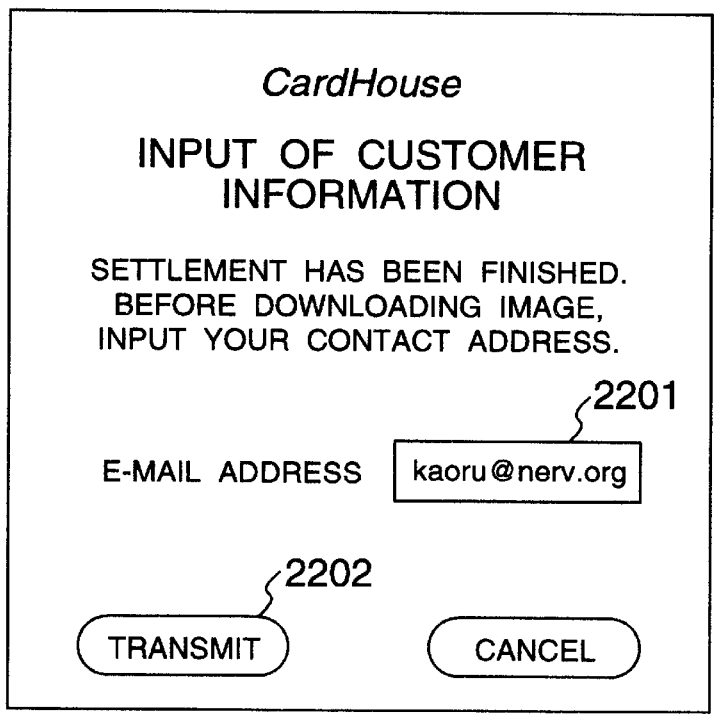
FIG. 22 is a diagram showing an example of a picture for input of an image customer information.

When the settlement process of the purchase price is normally finished, the digital contents value collection processing unit 216 collects the digital contents customer information 412. The cyber mall server 110 generates a customer information input page on the basis of the digital contents customer information 412 (1022) and, after that, transmits the customer information input page to the cyber mall client 130 (1023). After the customer information input page was received (1024), the cyber mall client 130 displays the customer information input page (1025). FIG. 22 shows an example of the customer information input page.

The log-in user inputs an electronic mail address 2201 and presses a transmission button 2202 (1026). When the transmission button 2202 is pressed, the cyber mall client 130 transmits the customer information inputted to the cyber mall server 110 (1027). The cyber mall server 110 receives the customer information (1028). The digital contents personal using condition definition processing unit 215 generates an entry into the digital contents personal using condition management table 217 (1029). The digital contents value collection processing unit 216 generates an entry into the customer information management table 218 (1030).

FIG. 24 shows an example of the entry of the digital contents personal using condition management table 217. As typical fields of the table, there are: a user ID 2401 as an identifier of the user who purchased the digital contents 101; a personal using condition ID 2402 as an identifier of the digital contents personal using conditions given to the digital contents customer; a goods name 2403 of the purchased digital contents 101; a member shop name 2404 of a member shop who sold the purchased digital contents 101; a purchase date 2405 as a date of purchase of the digital contents 101; a valid term 2406 as a term when it is possible to access to the purchased digital contents 101; and a using condition situation 2407 as a situation (for example, valid, out-of valid, etc.) of the using conditions.

In this example, the user ID 1401 inputted when the log-in is performed to the cyber mall is allocated to the user ID 2401. An identifier which is automatically given by the digital contents personal using condition definition processing unit 215 is allocated to the personal using condition ID 2402. The goods name 801 in the entry of the digital contents goods management table 213 in FIG. 8 is allocated to the goods name 2403. The member shop ID 802 is allocated to the member shop name 2404. The purchase date of the digital contents 101 is allocated to the purchase date 2405. A valid term is calculated on the basis of the term information of the entry of the using condition table 214 in FIG. 9 and is allocated to the valid term 2406. In this example, since the server access right 902 is set to "non-limitation", "indefinite" is allocated to the valid term 2406. The using condition situation 2407 is set to "valid". The value of the using condition situation 2406 can be set to "out-of term" or "invalid" besides "valid".

FIG. 25 shows an example of the entry of the user information management table. As typical fields of the table, there are: a user name 2501 as a name of the user who purchased the digital contents 101; an electronic mail address 2502 as an electronic mail address of the user who purchased the digital contents 101; an address 2503 as an address of the user who purchased the digital contents 101; and a telephone number 2504 as a telephone number of the user who purchased the digital contents 101. In this example, the electronic mail address 2201 inputted by the customer information input page of FIG. 22 is allocated to the electronic mail address 2502.

Figure 13:
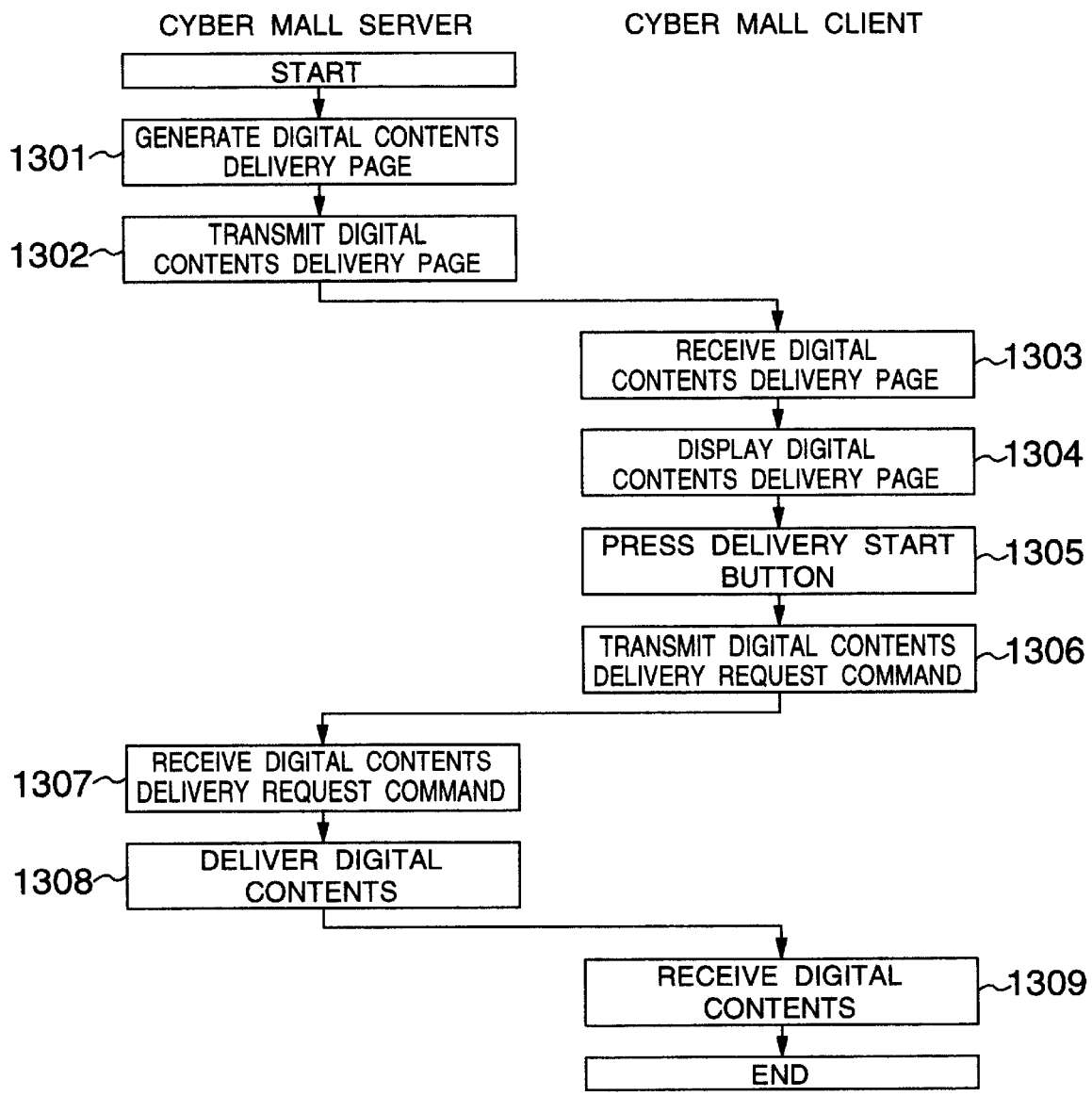
FIG. 13 is a diagram showing steps for a digital contents delivery.

Finally, the cyber mall server 110 delivers the digital contents 101 which the log-in user purchased (1031). FIG. 13 is a flowchart showing the detailed processes in step 1031. In this example, since the purchased digital contents 101 are the image file, the cyber mall server 110 delivers a copy of the image file to the cyber mall client 130.

Figure 23:
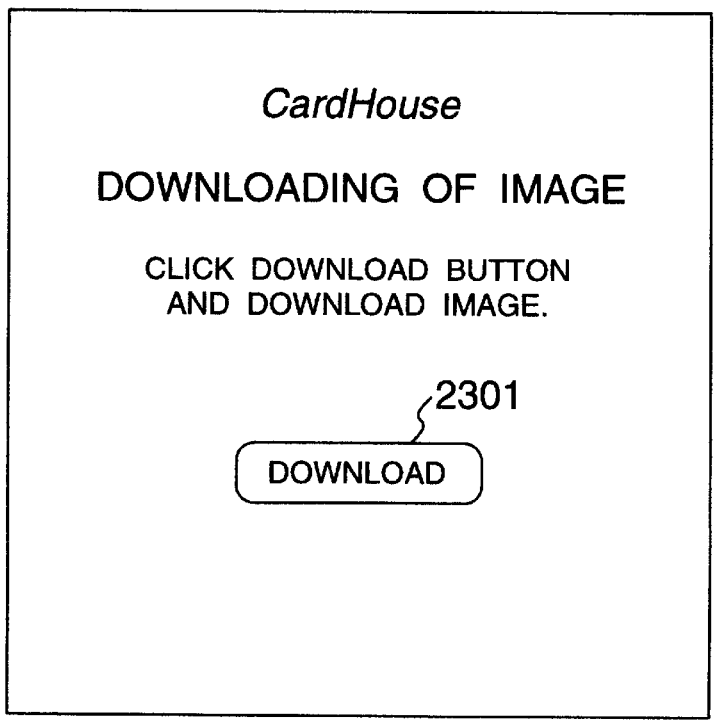
FIG. 23 is a diagram showing an example of a picture for start of a downloading of a purchase image.

The cyber mall server 110 generates a delivery start page of the purchase image (1301) and transmits the delivery start page of the purchase image to the cyber mall client 130 (1302). After the delivery start page of the purchase image was received (1303), the cyber mall client 130 displays the delivery start page of the purchase image (1304). FIG. 23 shows an example of the delivery start page of the purchase image.

When the log-in user presses a download button 2301 as a delivery start button of the purchase image (1305), the cyber mall client 130 transmits a digital contents delivery request command to the cyber mall server 110 (1306). After the cyber mall server 110 received the digital contents delivery request command (1307), the downloader 117 delivers the delivery article 116 in which the information of the physical act restriction 310 on the cyber mall client 130 side has been built in the copy of the digital contents 101 as a purchase image to the cyber mall client 130 (1308).

The cyber mall client 130 receives the delivery article (1309) and the digital contents purchasing process is finished. In the cyber mall client 130, the digital contents 101 in the delivery article 116 are displayed by the viewer 132. The viewer 132 is controlled by the information of the physical act restriction 310 on the cyber mall client 130 side built in the delivery article 116. In this manner, the processes in the flowcharts of FIGS. 13 and 10 are finished.

A case of purchasing "daily stock prices information of 3 months" in which the digital contents 101 are one of news services will now be described with reference to the flowchart of FIG. 10. A digital contents purchasing step is as follows.

First, the customer performs a log-in to the cyber mall (1001). FIG. 14 shows an example of a log-in picture. At the time of log-in, after the user ID 1401 and password 1402 were inputted, the log-in button 1403 is pressed.

Figure 26:
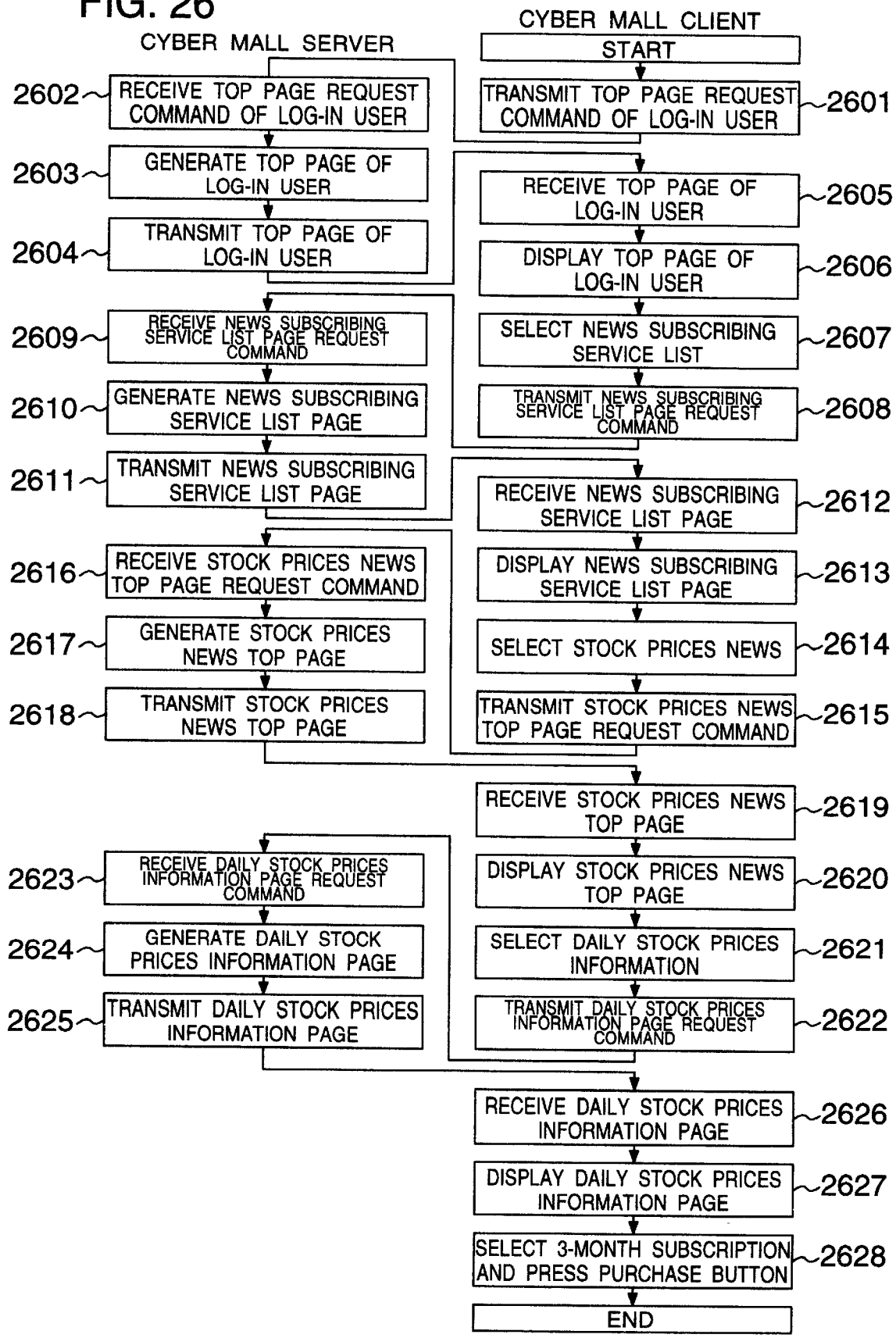
FIG. 26 is a diagram showing steps of searching news to be purchased.

After the log-in, the digital contents 101 to be purchased in the mall are searched (1002). FIG. 26 is a flowchart showing detailed processes in step 1002.

The cyber mall client 130 transmits a top page request command of the log-in user as a customer to the cyber mall server 110 (2601). The top page is a page of the log-in user himself/herself which is first displayed after the log-in was performed to the cyber mall. The cyber mall server 110 receives the top page request command of the log-in user (2602), generates a top page of the log-in user (2603), and thereafter, transmits the top page of the log-in user to the cyber mall client 130 (2604). After the top page of the log-in user was received (2605), the cyber mall client 130 displays the top page of the log-in user (2606). FIG. 15 shows an example of the top page for the log-in user.

Figure 27:
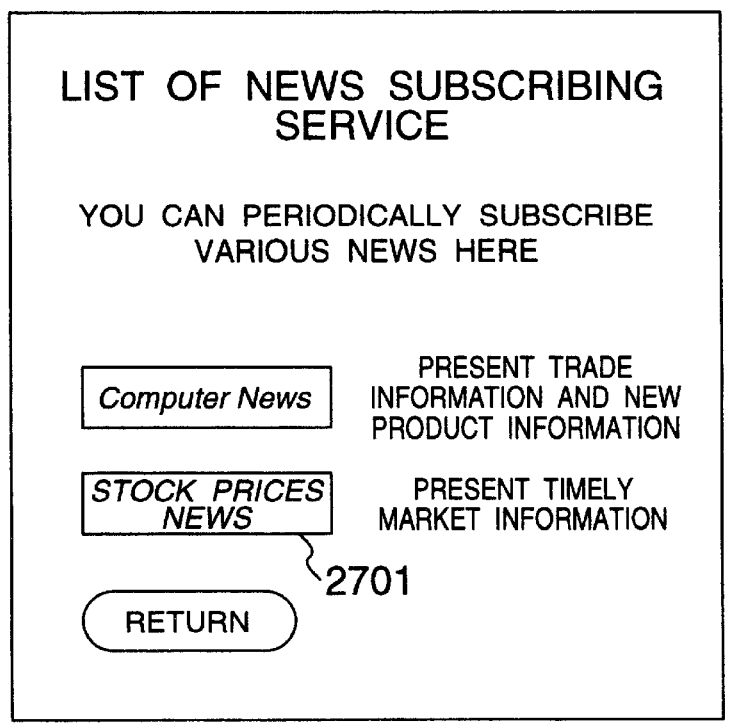
FIG. 27 is a diagram showing an example of a picture of a news subscribing service list.

In this example, since the stock prices news is purchased, in this page, the log-in user selects a news subscribing service list 1502 (2607). The cyber mall client 130 transmits a news subscribing service list page request command to the cyber mall server 110 (2608). The cyber mall server 110 receives the news subscribing service list page request command (2609), generates a news subscribing service list page (2610), and thereafter, transmits the news subscribing service list page to the cyber mall client 130 (2611). After the news subscribing service list page was received (2612), the cyber mall client 130 displays the news subscribing service list page (2613). FIG. 27 shows an example of the news subscribing service list page.

Figure 28:
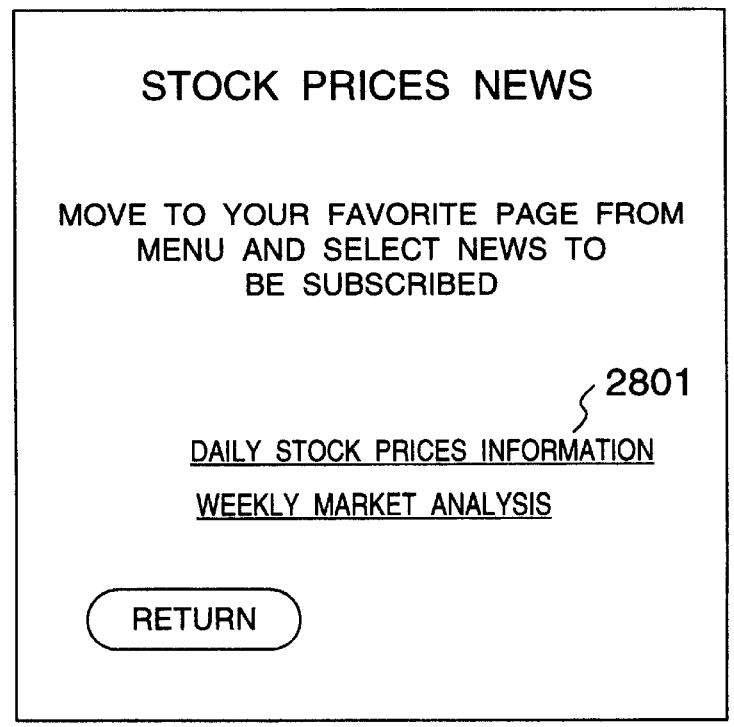
FIG. 28 is a diagram showing an example of a picture of a news service top page.

In this page, one of news services is selected from the news subscribing service list. The log-in user selects a stock prices news 2701 (2614). The cyber mall client 130 transmits a stock prices news top page request command to the cyber mall server 110 (2615). The cyber mall server 110 receives the stock prices news top page request command (2616), generates a stock prices news top page (2617), and thereafter, transmits the stock prices news top page to the cyber mall client 130 (2618). After the stock prices news top page was received (2619), the cyber mall client 130 displays the stock prices news top page (2620). FIG. 28 shows an example of the stock prices news top page.

Figure 29:
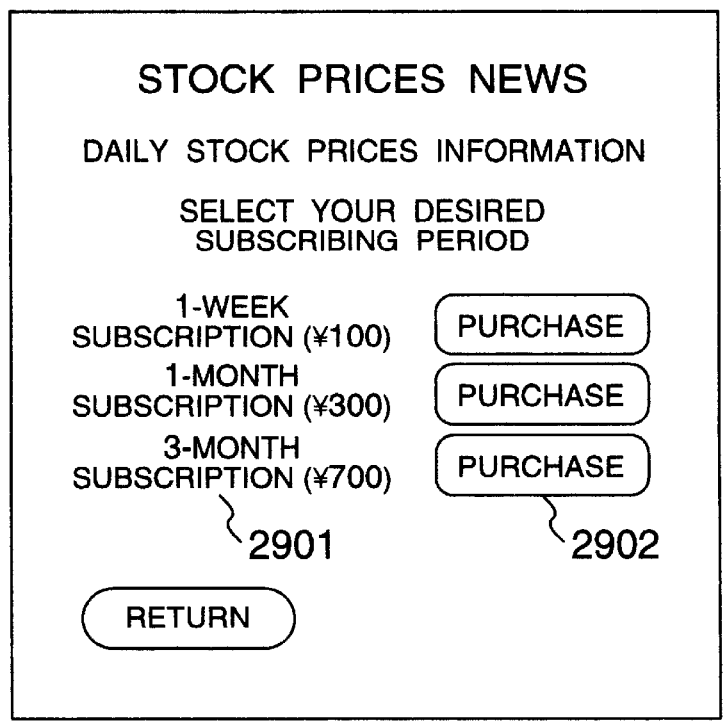
FIG. 29 is a diagram showing an example of a picture of a news service list.

In this page, one menu is selected to search the stock prices news to be purchased. The log-in user selects daily stock prices information 2801 (2621). The cyber mall client 130 transmits a daily stock prices information page request command to the cyber mall server 110 (2622). The cyber mall server 110 receives the daily stock prices information page request command (2623), generates a daily stock prices information page (2624), and thereafter, transmits the daily stock prices information page to the cyber mall client 130 (2625). After the daily stock prices information page was received (2626), the cyber mall client 130 displays the daily stock prices information page (2627). FIG. 29 shows an example of the daily stock prices information page.

In this page, one subscribing period of the daily stock prices information to be purchased is selected. The log-in user presses a purchase button 2902 beside a 3-month subscription 2901 to be purchased (2628). In this manner, the processes in the flowchart of FIG. 26 are finished.

The cyber mall client 130 transmits the information of the digital contents 101 to be purchased by the log-in user to the cyber mall server 110 (1003). The cyber mall server 110 receives the information of the digital contents 101 to be purchased by the log-in user (1004) and searches the digital contents using conditions 104 from the digital contents using condition table 214 on the basis of the received information (1005).

Figure 30:
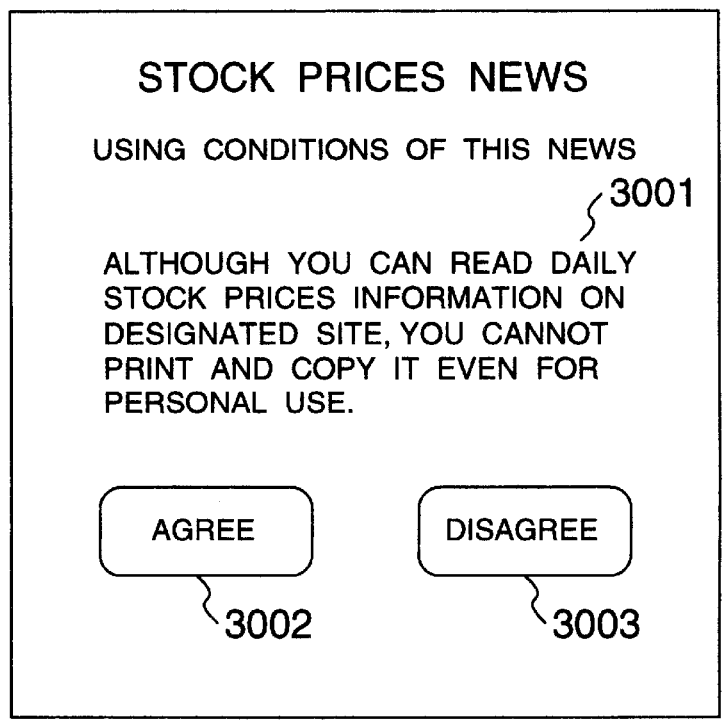
FIG. 30 is a diagram showing an example of a picture for display of an abstract of using conditions of a purchase news service.

The cyber mall server 110 generates a digital contents using condition abstract explanation page on the basis of the digital contents using conditions 104 (1006) and, thereafter, transmits the digital contents using condition abstract explanation page to the cyber mall client 130 (1007). After the digital contents using condition abstract explanation page was received (1008), the cyber mall client 130 displays the digital contents using condition abstract explanation page (1009). FIG. 30 shows an example of the digital contents using condition abstract explanation page.

The log-in user reads an abstract 3001 of the using conditions of the image to be purchased and presses an agree button 3002 if he/she agrees with the using conditions (1010). If the log-in user does not agree, he/she clicks a refuse button 3003 and finishes the processes.

When the agree button 1902 is pressed, the cyber mall client 130 transmits a message indicating that the log-in user agreed with the abstract 1901 of the using conditions to the cyber mall server 110 (1011). After the agreement information was received (1012), the cyber mall server 110 generates a digital contents using condition agreement explanation page on the basis of the digital contents using conditions 104 (1013) and, thereafter, transmits the digital contents using condition agreement explanation page to the cyber mall client 130 (1014). After the digital contents using condition agreement explanation page was received (1015), the cyber mall client 130 displays the digital contents using condition agreement explanation page (1016). FIG. 31 shows an example of the digital contents using condition agreement explanation page.

The log-in user reads an agreement 3101 of the using conditions of an image to be purchased and presses an agree button 3102 if he/she agrees with the contents of the agreement (1017). If the log-in user does not agree, he/she clicks a refuse button 3103 and finishes the processes.

When the agree button 3102 is pressed, the cyber mall client 130 transmits a message showing that the log-in user agreed with the agreement 2001 of the using conditions to the cyber mall server 110 (1018). After the agreement information was received (1019), the cyber mall server 110 retrieves the goods price 413 of the digital contents and the digital contents customer information 412 from the digital contents goods management table 213 (1020). The digital contents value collection processing unit 216 settles the purchase price on the basis of the goods price 413 of the digital contents (1021). FIG. 12 is a flowchart showing detailed processes in step 1021. In the embodiment, the settlement is performed by using a credit card.

The cyber mall server 110 generates a purchase price settlement page (1201) and transmits the purchase price settlement page to the cyber mall client 130 (1202). After the purchase price settlement page was received (1203), the cyber mall client 130 displays the purchase price settlement page (1204). FIG. 32 shows an example of the purchase price settlement page.

The log-in user inputs a kind 3201 of credit card, a credit card number 3202, a valid term 3203 of the credit card, and a name 3204 of card owner by using the purchase price settlement page and presses a settlement button 3205 (1205). When the settlement button 3205 is pressed, the cyber mall client 130 transmits the inputted settlement information to the cyber mall server 110 (1206). After the settlement information was received (1207), the cyber mall server 110 executes a settlement process of the credit card (1208). In this manner, the processes in the flowchart of FIG. 12 are finished.

Figure 33:
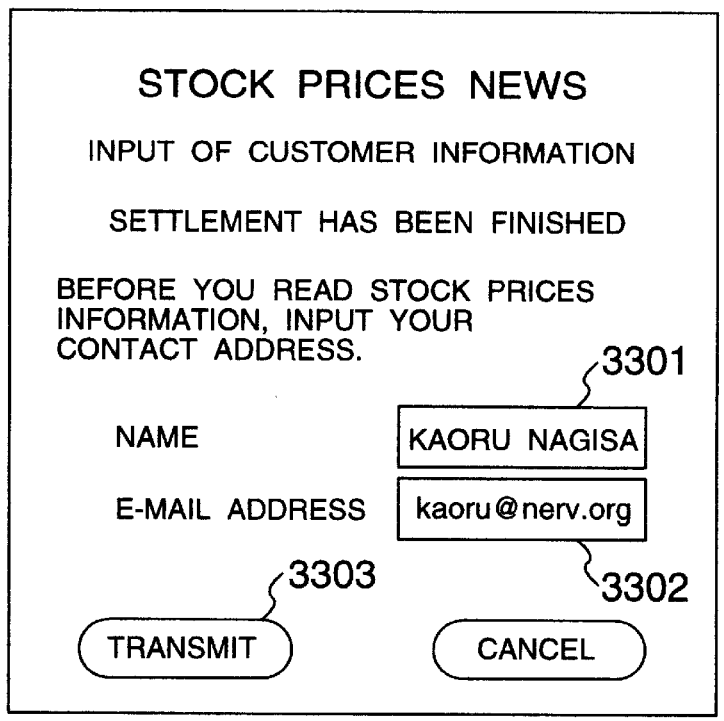
FIG. 33 is a diagram showing an example of a picture for input of news service customer information.

When the settlement process of the purchase price is normally finished, the digital contents value collection processing unit 216 collects the digital contents customer information 412. The cyber mall server 110 generates a customer information input page on the basis of the digital contents customer information 412 (1022) and, thereafter, transmits the customer information input page to the cyber mall client 130 (1023). After the customer information input page was received (1024), the cyber mall client 130 displays the customer information input page (1025). FIG. 33 shows an example of the customer information input page.

The log-in user inputs a name 3301 and an electronic mail address 3302 and presses a transmission button 3303 (1026). When the transmission button 3303 is pressed, the cyber mall client 130 transmits the inputted customer information to the cyber mall server 110 (1027). The cyber mall server 110 receives the customer information (1028). The digital contents personal using condition definition processing unit 215 generates an entry into the digital contents personal using condition management table 217 (1029). The digital contents value collection processing unit 216 generates an entry into the customer information management table 218 (1030).

FIG. 35 shows an example of the entry of the digital contents personal using condition management table 217. As typical fields of the table, there are: a user ID 3501 as an identifier of the user who purchased the digital contents 101; a personal using condition ID 3502 as an identifier of the digital contents personal using conditions given to the customer of the digital contents; a goods name 3503 of the purchased digital contents 101; a member shop name 3504 of a member shop which sold the purchased digital contents 101; a purchase date 3505 as a date of purchase of the digital contents 101; a valid term 3506 as a term during which it is possible to access to the purchased digital contents 101; and a using condition situation 3507 as a situation (for example, validity, out-of term, etc.) of the using conditions.

In this example, the user ID 1401 inputted when the log-in is performed to the cyber mall is allocated to the user ID 3501.

An identifier which is automatically given by the digital contents personal using condition definition processing unit 215 is allocated to the personal using condition ID 3502. The goods name "daily stock prices information of 3 months" in the entry of the present goods in the digital contents goods management table 213 is allocated to the goods name 3503. A member shop name "stock prices news" is allocated to the member shop name 3504. The date of purchase of the digital contents 101 is allocated to the purchase date 3505. A valid term is calculated on the basis of the term information of the entry in the using condition table 214 and allocated to the valid term 3506. In this example, the server access right is set to "limitation", the relative term is set to 3, and the relative term unit is set to month. Therefore, the date obtained by adding 3 months to the purchase date is allocated to the valid term 3506. The using condition situation 3507 is set to "valid".

FIG. 36 shows an example of the entry of the user information management table. As typical fields of the table, there are: a user name 3601 as a name of the user who purchased the digital contents 101; an electronic mail address 3602 as an electronic mail address of the user who purchased the digital contents 101; an address 3603 as an address of the user who purchased the digital contents 101; and a telephone number 3604 as a telephone number of the user who purchased the digital contents 101. In this example, the name 3301 inputted by the customer information input page in FIG. 33 is allocated to the user name 3601. The electronic mail address 3302 is allocated to the electronic mail address 3602.

Finally, the cyber mall server 110 delivers the digital contents 101 which the log-in user purchased (1031). FIG. 13 is a flowchart showing the detailed processes in step 1030. In this example, since the purchased digital contents 101 are the news service, the cyber mall server 110 enables the cyber mall client 130 to view the WWW page in which the daily stock prices information is displayed.

Figure 34:
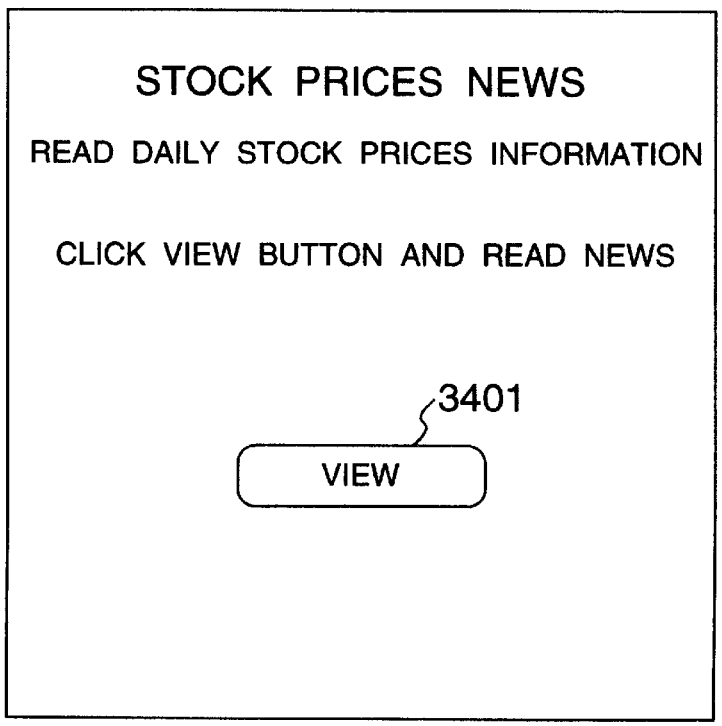
FIG. 34 is a diagram showing an example of a picture for start of a viewing of a purchase news service.

The cyber mall server 110 generates a delivery start page of the purchase news service (1301) and transmits the delivery start page of the news service to the cyber mall client 130 (1302). After the delivery start page of the news service was received (1303), the cyber mall client 130 displays the delivery start page of the news service (1304). FIG. 34 shows an example of the delivery start page of the news service.

When the log-in user presses a view button 3401 as a delivery start button of the news service (1305), the cyber mall client 130 transmits a digital contents delivery request command to the cyber mall server 110 (1306). After the digital contents delivery request command was received (1307), the cyber mall server 110 delivers the WWW page in which the daily stock prices information is displayed (1308).

In the cyber mall client 130, the delivered WWW page is displayed (1309) and the digital contents purchasing process is finished. In this manner, the processes in the flowcharts of FIGS. 13 and 10 are finished. As mentioned above, even if the kinds of digital contents differ, the purchasing steps are the same.

Figure 37:
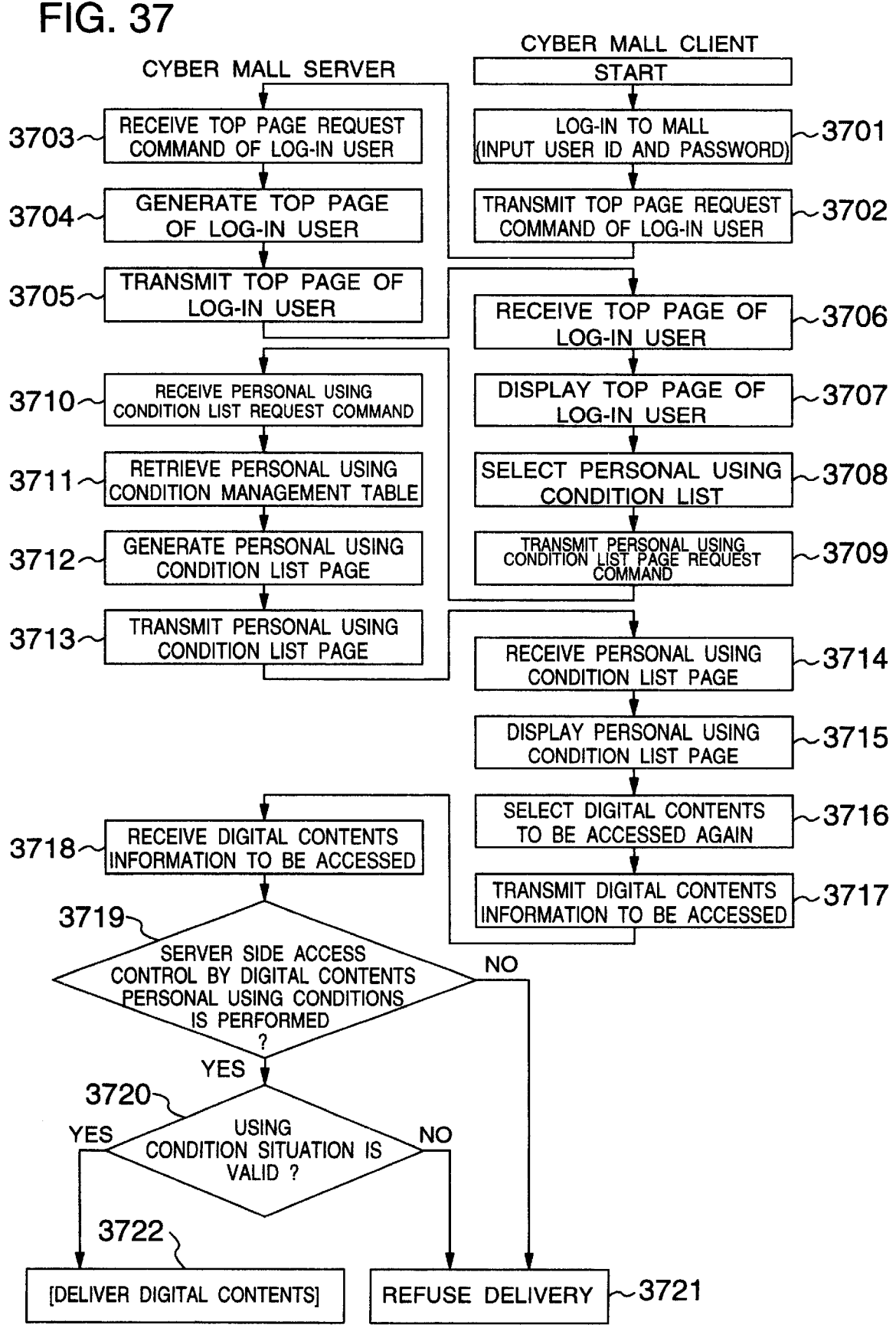
FIG. 37 is a diagram showing steps of again purchasing goods.

A re-purchasing step of the digital contents 101 when the delivery of the purchased digital contents 101 fails will now be made with reference to a flowchart of FIG. 37. In the embodiment, the image file purchased in the flowchart of FIG. 10 is again purchased. The re-purchasing step of the digital contents 101 is as follows.

First, the customer performs a log-in to the cyber mall (3701). FIG. 14 shows an example of the log-in picture. At the time of log-in, after the user ID 1401 and password 1402 were inputted, the log-in button 1403 is pressed.

After the log-in, the cyber mall client 130 transmits a top page request command of the log-in user to the cyber mall server 110 (3702). The cyber mall server 110 receives the top page request command of the log-in user (3703), generates a top page of the log-in user (3704), and thereafter, transmits the top page of the log-in user to the cyber mall client 130 (3705). After the top page of the log-in user was received (3706), the cyber mall client 130 displays the top page of the log-in user (3707). FIG. 15 shows an example of the top page picture for the log-in user.

When the digital contents 101 are again purchased, the log-in user selects the personal using condition list 1504 (3708). The cyber mall client 130 transmits a personal using condition list page request command to the cyber mall server 110 (3709). The cyber mall server 110 receives the personal using condition list page request command (3710). The digital contents personal using condition retrieval processing unit 219 retrieves the digital contents personal using condition management table 217 on the basis of the user ID of the log-in user and extracts the personal using conditions of all of the digital contents which the log-in user purchased (3711). The cyber mall server 110 generates a personal using condition list page on the basis of the extracted digital contents personal using conditions (3712) and, thereafter, transmits the personal using condition list page to the cyber mall client 130 (3713). After the personal using condition list page was received (3714), the cyber mall client 130 displays the personal using condition list page (3715). FIG. 38 shows an example of the personal using condition list page.

In the first line of the personal using condition list, information of the entry in the digital contents personal using condition management table 217 in FIG. 24 is displayed. In the second line, information of the entry in the digital contents personal using condition management table 217 in FIG. 35 is displayed.

The member shop name 2404 is displayed in 3801. The personal using condition ID 2402 is displayed in 3802. The goods name 2403 is displayed in 3803. The valid term 2406 is displayed in 3804. The member shop name 3504 is displayed in 3806. The personal using condition ID 3502 is displayed in 3807. The goods name 3503 is displayed in 3808. The valid term 3506 is displayed in 3809. The delivering method of the purchased digital contents 101 is displayed in 3805 and 3810. The reason why "download" is displayed in 3805 is because the image file is the digital contents of the kind which is delivered to the customer. The reason why "read" is displayed in 3810 is because the daily stock prices information is the digital contents of the kind in which the WWW page is viewed.

The log-in user selects the accessing method 3805 to the image file in which the delivery fails (3716). The cyber mall client 130 transmits the information of the selected digital contents personal using condition to the cyber mall server 110 (3717). After the information of the selected digital contents personal using condition was received (3718), the cyber mall server 110 executes a server side access control on the basis of the valid term 2406 of the selected digital contents personal using condition (3719). When the valid term 2406 lies within the term and the using condition situation 2407 of the selected digital contents personal using condition is valid (3720), the cyber mall server 110 delivers the digital contents (3722). When the using condition situation of the selected digital contents personal using conditions is not valid and when the valid term 2406 does not lie within the term, the cyber mall server 110 does not deliver the digital contents 101 (3721).

A flowchart showing the detailed processes in step 3722 is the flowchart of FIG. 13. In this example, since the digital contents 101 which are again purchased are the image file, the cyber mall server 110 delivers a copy of the image file to the cyber mall client 130.

The cyber mall server 110 generates a delivery start page of the purchase image (1301) and transmits the delivery start page of the purchase image to the cyber mall client 130 (1302). After the delivery start page of the purchase image was received (1303), the cyber mall client 130 displays the delivery start page of the purchase image (1304). FIG. 23 shows an example of the delivery start page of the purchase image.

When the log-in user presses the download button 2301 as a delivery start button of the purchase image (1305), the cyber mall client 130 transmits a digital contents delivery request command to the cyber mall server 110 (1306). After cyber mall server 110 received the digital contents delivery request command (1307), the downloader 117 delivers the delivery article 116 obtained by building the information of the physical act restriction 310 on the cyber mall client 130 side into the copy of the digital contents 101 as a purchase image to the cyber mall client 130 (1308).

The cyber mall client 130 receives the delivery article (1309) and the digital contents purchasing process is finished. In the cyber mall client 130, the digital contents 101 in the delivery article 116 is displayed by the viewer 132. The viewer 132 is controlled by the information of the physical act restriction 310 on the cyber mall client 130 side built in the delivery article 116. In this manner, the processes in the flowcharts of FIGS. 13 and 37 are finished.

A re-purchasing step when the delivery of the news service purchased in the flowchart of FIG. 10 fails will now be described with reference to the flowchart of FIG. 37. The re-purchasing step is as follows.

First, the customer performs a log-in to the cyber mall (3701). FIG. 14 shows an example of the log-in picture. At the time of log-in, after the user ID 1401 and password 1402 were inputted, the log-in button 1403 is pressed.

After the log-in, the cyber mall client 130 transmits a top page request command of the log-in user to the cyber mall server 110 (3702). The cyber mall server 110 receives the top page request command of the log-in user (3703), generates a top page of the log-in user (3704), and thereafter, transmits the top page of the log-in user to the cyber mall client 130 (3705). After the top page of the log-in user was received (3706), the cyber mall client 130 displays the top page of the log-in user (3707). FIG. 15 shows an example of the top page picture plane for the log-in user.

When the digital contents 101 are again purchased, the log-in user selects the personal using condition list 1504 (3708). The cyber mall client 130 transmits a personal using condition list page request command to the cyber mall server 110 (3709). The cyber mall server 110 receives the personal using condition list page request command (3710). The digital contents personal using condition retrieval processing unit 219 retrieves the digital contents personal using condition management table 217 on the basis of the user ID of the log-in user and extracts the personal using conditions of all of the digital contents which the log-in user purchased (3711). The cyber mall server 110 generates a personal using condition list page on the basis of the extracted digital contents personal using conditions (3712) and, thereafter, transmits the personal using condition list page to the cyber mall client 130 (3713). After the personal using condition list page was received (3714), the cyber mall client 130 displays the personal using condition list page (3715). FIG. 38 shows an example of the personal using condition list page.

The log-in user selects the delivering method 3810 to the news service in which the delivery fails (3716). The cyber mall client 130 transmits the information of the selected digital contents personal using condition to the cyber mall server 110 (3717). After the information of the selected digital contents personal using condition was received (3718), the cyber mall server 110 executes a server side access control on the basis of the valid term 3506 of the selected digital contents personal using condition (3719). When the valid term 3506 lies within the term and the using condition situation 3507 of the selected digital contents personal using condition is valid (3720), the cyber mall server 110 delivers the digital contents (3722). When the using condition situation of the selected digital contents personal using condition is not valid and when the valid term 3506 does not lie within the term, the cyber mall server 110 does not deliver the digital contents 101 (3721).

A flowchart showing the detailed processes in step 3722 is the flowchart of FIG. 13. In this example, since the digital contents 101 which are again purchased are the news service, the cyber mall server 110 enables the cyber mall client 130 to view the WWW page in which the daily stock prices information is displayed.

The cyber mall server 110 generates a delivery start page of the news service (1301) and transmits the delivery start page of the news service to the cyber mall client 130 (1302). After the delivery start page of the news service was received (1303), the cyber mall client 130 displays the delivery start page of the news service (1304). FIG. 34 shows an example of the delivery start page of the news service.

When the log-in user presses the view button 3401 as a delivery start button of the news service (1305), the cyber mall client 130 transmits a digital contents delivery request command to the cyber mall server 110 (1306). After cyber mall server 110 received the digital contents delivery request command (1307), the WWW page in which the daily stock prices information is displayed is delivered (1308).

In the cyber mall client 130, the delivered WWW page is displayed (1309) and the digital contents purchasing process is finished. In this manner, the processes in the flowcharts of FIGS. 13 and 37 are finished. Even if the kinds of digital contents-differ, the re-purchasing steps are the same.

According to the invention as described above, by using the digital contents using conditions and the personal using conditions, even if the delivery of the purchased digital contents fails, when the digital contents are again purchased, the digital contents are again delivered by merely selecting the digital contents in which the re-delivery is desired from the personal using condition list of the digital contents given to the customer. If the personal using conditions of the selected digital contents are valid, the digital contents are again delivered without again paying the goods price. When the digital contents are again purchased, since the customer information inputted as one of the values of the digital contents has been accumulated in the customer information management table at the time of purchase of the digital contents, there is no need to again input the customer information. Those procedures are the same irrespective of the kind of digital contents. Therefore, a use efficiency of the cyber mall system is improved for the customer.

Since the value generally changes depending on the using conditions in the sales of the digital contents, by defining the using conditions of different act restrictions and the value according to each using condition to the same digital contents, the sales and viewing according to each of the using conditions of the digital contents are realized.

According to the invention, not only a goods catalog of the digital contents can be generated from the goods definition information of the digital contents but also the digital contents personal using conditions can be generated and given to the customer, so that there is no need to wait for the double information. Consequently, the processes from the sales promotion and order of the digital contents to the settlement can be executed from the same information without causing any mistake.

What is claimed is:

1. A contents sales method in a contents sales apparatus which sells digital contents and is connected to a contents purchasing apparatus and a cyber shop apparatus, wherein when said digital contents which are sold by said cyber shop apparatus are registered into said contents sales apparatus, digital contents using conditions comprising a server side access control to said digital contents which is executed on said contents sales apparatus side and a physical act restriction to control an access to said digital contents which is executed on said contents purchasing apparatus side that purchased said digital contents are defined;

when said digital contents are sold, a variable portion of said digital contents using conditions corresponding to said digital contents is replaced by a specific definite value thereby generating dedicated digital contents personal using conditions for a digital contents customer and giving said digital contents personal using conditions to said digital contents customer; and if a delivery of said digital contents to said contents purchasing apparatus fails, when said digital contents are sold, said server side access control to said digital contents based on said digital contents personal using conditions given to said digital contents customer is executed, and only when said digital contents personal using conditions are valid, said digital contents are again delivered to said contents purchasing apparatus.

2. A contents sales method in a contents sales apparatus which sells digital contents and is connected to a contents purchasing apparatus and a cyber shop apparatus, wherein when said digital contents which are sold by said cyber shop apparatus are registered into said contents sales apparatus, digital contents using conditions comprising a server side access control to said digital contents which is executed an said contents sales apparatus side and a physical act restriction to control an access to said digital contents which is executed on said contents purchasing apparatus side that purchased said digital contents are defined;

when said digital contents are sold, a variable portion of said digital contents using conditions corresponding to said digital contents is replaced by a specific definite value thereby generating dedicated digital contents personal using conditions for a digital contents customer and giving said digital contents personal using conditions to said digital contents customer; and if a delivery of said digital contents to said contents purchasing apparatus fails, said digital contents customer selects said digital contents personal using conditions corresponding to said digital contents whose delivery fails from said digital contents personal using conditions given to himself/herself, so that said digital contents are again delivered.

3. A contents sales method in a cyber shop apparatus which sells digital contents and is connected to a contents sales apparatus, wherein when said digital contents to be sold are registered into said contents sales apparatus, a goods price of the digital contents, customer information of the digital contents, a digital contents value comprising a contract regarding the use of the digital contents, and goods attributes of the digital contents are further defined, and one digital contents is registered as a plurality of goods by a combination of digital contents using conditions, said digital contents value, and said goods attributes of the digital contents; and if said contents sales apparatus fails in delivering said digital contents to said contents purchasing apparatus, when said digital contents are sold, a server side access control to said digital contents personal using conditions given to a digital contents customer is executed, and only when said digital contents personal using conditions are valid, said digital contents are again delivered to said contents purchasing apparatus without again collecting said digital contents value.

4. A contents sales method in a cyber shop apparatus which sells digital contents and is connected to a contents sales apparatus, wherein when said digital contents to be sold are registered into said contents sales apparatus, a goods price of the digital contents, customer information of the digital contents, a digital contents value comprising a contract regarding the use of the digital contents, and goods attributes of the digital contents are further defined, and one digital contents is registered as a plurality of goods by a combination of digital contents using conditions, said digital contents value, and said goods attributes of the digital contents; and if said contents sales apparatus fails in delivering said digital contents to said contents purchasing apparatus, a digital contents customer selects said digital contents personal using conditions corresponding to said digital contents whose delivery fails from said digital contents personal using conditions given to himself/herself, thereby re-delivering said digital contents.

5. A contents sales method according to claim 1, wherein said variable portion of said digital contents includes relative period limitation information of said access control.

6. A contents sales method according to claim 1, wherein said specific definite value includes specific day and time.

7. A contents sales method according to claim 5, wherein said specific definite value includes specific day and time.

8. A contents sales method according to claim 2, wherein said variable portion of said digital contents includes relative period limitation information of said access control.

9. A contents sales method according to claim 2, wherein said specific definite value includes specific day and time.

10. A contents sales method according to claim 8, wherein said specific definite value includes specific day and time.

* * * * *